US012677352B2

(12) United States Patent
Lu et al.

(10) Patent No.: US 12,677,352 B2
(45) Date of Patent: Jul. 7, 2026

(54) SESSION PROCESSING METHOD AND APPARATUS

(71) Applicant: Huawei Technologies Co., Ltd., Shenzhen (CN)

(72) Inventors: Wei Lu, Shenzhen (CN); Runze Zhou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/907,556

(22) Filed: Jun. 22, 2020

(65) Prior Publication Data
US 2020/0323029 A1　　Oct. 8, 2020

Related U.S. Application Data

(63) Continuation of application No. PCT/CN2019/092819, filed on Jun. 25, 2019.

(30) Foreign Application Priority Data

Jun. 26, 2018　(CN) .......................... 201810672723.4
Nov. 20, 2018　(CN) .......................... 201811386967.2

(51) Int. Cl.
　　*H04M 15/00*　　　(2024.01)
　　*H04W 68/00*　　　(2009.01)
　　　　　　　　(Continued)

(52) U.S. Cl.
　　CPC ........... *H04W 80/10* (2013.01); *H04M 15/66* (2013.01); *H04W 68/005* (2013.01); *H04W 76/11* (2018.02); *H04W 76/25* (2018.02)

(58) Field of Classification Search
　　CPC ... H04L 12/1407; H04M 15/66; H04W 36/00; H04W 4/24; H04W 68/005; H04W 76/11;
　　　　　　(Continued)

(56) References Cited

U.S. PATENT DOCUMENTS

2015/0237532　A1　8/2015　Zhang
2015/0282015　A1　10/2015　Lindholm et al.
　　　　　　(Continued)

FOREIGN PATENT DOCUMENTS

CN　　106900031 A　　6/2017
CN　　107018542 A　　8/2017
　　　　　(Continued)

OTHER PUBLICATIONS

China Telecom, "UPF selection factor," SA WG2 Meeting #S2-128, Jul. 2-Jul. 6, 2018, Vilnius, Lithuania, S2-186504, 3 pages.
　　　　　(Continued)

*Primary Examiner* — Derrick W Ferris
*Assistant Examiner* — M Mostazir Rahman
(74) *Attorney, Agent, or Firm* — Conley Rose, P.C.

(57) ABSTRACT

A session processing method and an apparatus, where the method includes: receiving, by an access management network element, access point information that is of an application of a first session and that is from a first session management network element; receiving a request message from a terminal, where the request message includes an identifier of the first session and an identifier of a second session; selecting a second session management network element based on the access point information of the application; selecting a third session management network element; sending a first request message to the second session management network element, where the first request message requests establishing the second session; and/or sending a second request message to the third session management network element, where the second request message requests establishing the second session.

22 Claims, 16 Drawing Sheets

(51) Int. Cl.
H04W 76/11 (2018.01)
H04W 76/25 (2018.01)
H04W 80/10 (2009.01)
(58) Field of Classification Search
CPC ..... H04W 76/12; H04W 76/15; H04W 76/25;
H04W 80/10
See application file for complete search history.

(56) References Cited

U.S. PATENT DOCUMENTS

| | | | | |
|---|---|---|---|---|
| 2017/0367026 | A1* | 12/2017 | Li | H04L 63/102 |
| 2018/0199398 | A1* | 7/2018 | Dao | H04W 76/27 |
| 2018/0317157 | A1* | 11/2018 | Baek | H04W 28/16 |
| 2019/0223060 | A1 | 7/2019 | Zhou et al. | |
| 2019/0274185 | A1* | 9/2019 | Stojanovski | H04L 47/2441 |
| 2020/0120570 | A1 | 4/2020 | Youn et al. | |
| 2020/0336937 | A1* | 10/2020 | Youn | H04W 76/18 |
| 2021/0099943 | A1* | 4/2021 | Dannebro | H04L 67/63 |
| 2021/0112478 | A1* | 4/2021 | Dannebro | H04W 40/24 |
| 2021/0243826 | A1* | 8/2021 | Hoffmann | H04W 68/005 |
| 2021/0345441 | A1* | 11/2021 | Wang | H04W 76/22 |
| 2022/0360977 | A1* | 11/2022 | Kim | H04W 36/12 |

FOREIGN PATENT DOCUMENTS

| | | | |
|---|---|---|---|
| CN | 107592331 | A | 1/2018 |
| CN | 107959918 | A | 4/2018 |
| CN | 108200206 | A | 6/2018 |
| RU | 2557089 | C2 | 7/2015 |
| WO | 2014067474 | A1 | 5/2014 |
| WO | 2017190640 | A1 | 11/2017 |
| WO | 2018111029 | A1 | 6/2018 |

OTHER PUBLICATIONS

Samsung, "TS 23.502: P-CR on UPF relocation procedure for SSC mode 2 and 3," SA WG2 Meeting #119, Feb. 13-17, 2017, Dubrovnik, Croatia, S2-171079, 3 pages.
Huawei, et al., Select the same SMF+UPF for PDU sessions of the same DNN within one slice. 3GPP TSG-SA WG2 Meeting #126, Montreal, Canada, Feb. 26-Mar. 2, 2018, S2-182864, 4 pages.
ZTE "23.502 P-CR: Clarification on PDU session ID in the service request message," Jun. 26-30, 2017, San Jose Del Cabo, Mexico, S2-174687, 11 pages.
Yanli, Q., et al., "MEC Coordinated Future 5G Mobile Wireless Networks," Journal of Computer Research and Development, Mar. 15, 2018, 9 pages.
3GPP TS 23.502 V15.2.0, Jun. 2018, "3rd Generation Partnership Project; Technical Specification Group Services and System Aspects; Procedures for the 5G System; Stage 2 (Release 15)," 308 pages.
3GPP TS 23.501 V15.2.0, Jun. 2018, "3rd Generation Partnership Project; Technical Specification Group Services and System Aspects; System Architecture for the 5G System; Stage 2 (Release 15)," 216 pages.
3GPP TS 23.682 V15.5.0, Jun. 2018, "3rd Generation Partnership Project; Technical Specification Group Services and System Aspects; Architecture enhancements to facilitate communications with packet data networks and applications (Release 15)," 125 pages.
3GPP TS 29.512 V15.0.0 "3rd Generation Partnership Project; Technical Specification Group Core Network and Terminals; 5G System; Session Management Policy Control Service; Stage 3 (Release 15)," Jun. 2018, 82 pages.
3GPP TS 29.518 V15.0.0 "3rd Generation Partnership Project; Technical Specification Group Core Network and Terminals; 5G System; Access and Mobility Management Services; Stage 3 (Release 15)," Mar. 2018, 154 pages.

* cited by examiner

SESSION PROCESSING METHOD AND APPARATUS

CROSS-REFERENCE TO RELATED APPLICATIONS

This application is a continuation of International Patent Application No. PCT/CN2019/092819, filed on Jun. 25, 2019, which claims priority to Chinese Patent Application No. 201811386967.2, filed on Nov. 20, 2018, and Chinese Patent Application No. 201810672723.4, filed on Jun. 26, 2018. The disclosures of the aforementioned applications are hereby incorporated by reference in their entireties.

TECHNICAL FIELD

This application relates to the field of mobile communication technologies, and in particular, to a session processing method and an apparatus.

BACKGROUND

In some cases, an application may not support relocation (not application relocation possibility). For example, in a moving process of a terminal, no application function (AF) server corresponding to the application is deployed near a current location of the terminal, or even if an AF server corresponding to the application is deployed, the AF server does not support context transfer on an application layer. To be more specific, to better provide the terminal with better user experience and for other reasons, when an AF server corresponding to the application requests the terminal to perform a service of the application, the terminal still needs to connect to an AF server that corresponds to the application and to which the terminal connects at an old location of the terminal that is before the terminal moves.

For the foregoing application scenario, there is no corresponding implementation solution currently.

SUMMARY

This application provides a session processing method and an apparatus, to select appropriate network devices for applications that do not support relocation, and select a corresponding splitting policy for data flows of the applications in a moving process of a terminal.

In this application, before the terminal moves, a session management network element providing a service for the terminal is referred to as a first session management network element. After the terminal moves, one or more session management network elements each providing a service for the terminal may be implemented using the following methods.

Implementation method 1: The session management network elements each providing the service for the terminal include a second session management network element and a third session management network element. The second session management network element may be configured to select a second user plane network element, and the second user plane network element is configured to provide a service for a data flow of an application that does not support application relocation. The third session management network element may be configured to select a third user plane network element, and the third user plane network element is configured to provide a service for a data flow of an application that supports application relocation. The second session management network element and the first session management network element may be a same session management network element, or may be different session management network elements.

Implementation method 2: The session management network element providing the service for the terminal includes a fourth session management network element, and the fourth session management network element has functions of the second session management network element and the third session management network element in the implementation method 1. The fourth session management network element and the first session management network element may be a same session management network element, or may be different session management network elements.

For ease of description, the following uses the implementation method 1 as an example for description. The implementation method 2 is described in detail in an example implementation.

Further, in this application, a session established by the terminal may be a session in a session and service continuity (SSC) mode 3. To be more specific, a mode type of the session is the SSC mode 3. Alternatively, a session established by the terminal may be a session in an SSC mode 1. To be more specific, a mode type of the session is the SSC mode 1.

For ease of description, an example in which the mode type of the session established by the terminal is the SSC mode 3 is used below for description. In addition, a session established by the terminal before the terminal moves is referred to as a first session, and a session reestablished by the terminal after the terminal moves is referred to as a second session. That the mode type of the session established by the terminal is the SSC mode 1 is described in detail in an implementation.

Further, in this application, before and after the terminal moves, access management network elements each providing a service for the terminal may be a same access management network element, or may be different access management network elements. For ease of description, this application is described using an example in which before and after the terminal moves, the access management network elements each providing the service for the terminal are the same access management network element.

According to a first aspect, this application provides a session processing method. The method includes: receiving, by an access management network element, access point information that is of an application of a first session and that is from a first session management network element; receiving, by the access management network element, a request message from a terminal, where the request message includes an identifier of the first session and an identifier of a second session; selecting, by the access management network element, a second session management network element based on the access point information of the application; selecting, by the access management network element, a third session management network element; sending, by the access management network element, a first request message to the second session management network element, where the first request message requests to establish the second session; and sending, by the access management network element, a second request message to the third session management network element, where the second request message requests to establish the second session. Based on this solution, the access management network element selects the second session management network element based on the received access point information of the application of the first session. The access point information may be from an AF server that corresponds to the application and that does not support application relocation. Therefore, the selected second session management network element may provide a service for the AF server.

In a possible implementation, selecting, by the access management network element, a second session management network element based on the access point information of the application includes selecting, by the access management network element, the first session management network element as the second session management network element based on the access point information of the application.

In a possible implementation, the first request message may include the access point information of the application. The access point information is used by the second session management network element to select a user plane network element. To be more specific, the second session management network element may select the user plane network element based on the access point information of the application. The user plane network element is referred to as a second user plane network element in this application. The second session management network element selects the second user plane network element based on the access point information of the application. Therefore, the second user plane network element may provide a service for an AF server corresponding to the application.

In another possible implementation, the first request message may further include the identifier of the first session and the identifier of the second session. In this way, when the second session management network element and the first session management network element are a same session management network element, the second session management network element may obtain locally stored session context information based on the identifier of the second session. The context stores access point information of an application that is received by the second session management network element from a third-party application server. Therefore, the second session management network element may select the second user plane network element based on the access point information that is of the application and that is in the session context information.

In a possible implementation, the access management network element may further send information about the second session management network element to the third session management network element. The information about the second session management network element is used to establish a connection between the third session management network element and the second session management network element. After the connection is established between the third session management network element and the second session management network element, the connection may be used to transmit splitting information of data flows of applications of the second session. The splitting information includes information about a splitting network element and/or splitting policy information. The splitting information may further include information about a policy control network element.

In a possible implementation, the access management network element may further obtain splitting policy information of applications of the second session, and then send the splitting policy information to the second session management network element or the third session management network element. The splitting policy information may be generated using the splitting policy information and sent to a splitting network element by the second session management network element or the third session management network element.

In another possible implementation, the access management network element may further obtain information about a policy control network element corresponding to the first session, and then send the information about the policy control network element to the second session management network element or the third session management network element. In this way, the second session management network element or the third session management network element may request, based on the information about the policy control network element, to obtain splitting policy information from the policy control network element.

According to a second aspect, this application provides a session processing method. The method includes: receiving, by a third session management network element, a second request message from an access management network element, where the second request message includes information about a second session management network element, and the second request message requests to establish a second session; selecting, by the third session management network element, a third user plane network element, where the third user plane network element is configured to route a data flow of a first application of the second session, and the first application is an application that supports application relocation; and establishing, by the third session management network element, a connection to the second session management network element based on the information about the second session management network element, where the connection is used to transmit splitting information of data flows of applications of the second session. The splitting information includes information about a splitting network element and/or splitting policy information. Based on this solution, the third user plane network element can be configured to route the data flow of the first application of the second session. The first application is an application that supports application relocation. A data flow of an application that does not support application relocation is routed by another user plane network element. In this way, a data flow of an application that supports application relocation and a data flow of an application that does not support application relocation can be split.

In a possible implementation, the third session management network element may further select a splitting network element. The splitting network element is configured to split the data flows of the applications of the second session.

In another possible implementation, the second session management network element selects a splitting network element. Then the third session management network element obtains information about the splitting network element from the second session management network element.

In a possible implementation, the third session management network element may further establish a data transmission channel between the splitting network element and the third user plane network element.

In a possible implementation, the third session management network element may further obtain the splitting policy information, determine a splitting policy based on the splitting policy information, and then send the splitting policy to the splitting network element.

The third session management network element may obtain the splitting policy information from a policy control network element. Alternatively, the third session management network element may further obtain the splitting policy information from the access management network element. Alternatively, the third session management network element may further obtain the splitting policy information from the second session management network element. If the third session management network element obtains the splitting policy information from the policy control network element, before obtaining the splitting policy information from the policy control network element, the third session management network element further needs to obtain information about the policy control network element, for example, identification information of the policy control network element.

According to a third aspect, this application provides a session processing method. The method includes: receiving, by a second session management network element, a first request message from an access management network element, where the first request message requests to establish a second session; and selecting, by the second session management network element, a second user plane network element, where the second user plane network element is configured to route a data flow of a second application of the second session, and the second application is an application that does not support application relocation. Based on this solution, the second user plane network element may be configured to route the data flow of the second application of the second session, and the second application is an application that does not support application relocation. In this way, a data flow of an application that does not support application relocation can be routed, such that after moving, the terminal can still access the application that does not support application relocation.

In a possible implementation, if the first request message includes an identifier of a first session, selecting, by the second session management network element, a second user plane network element includes: obtaining, by the second session management network element, session context information based on the identifier of the first session; and then selecting the second user plane network element based on the session context information, where the session context information includes access point information of an application.

In another possible implementation, if the first request message includes access point information of an application of a first session, selecting, by the second session management network element, a second user plane network element includes selecting, by the second session management network element, the second user plane network element based on the access point information of the application.

In a possible implementation, a third session management network element may further select a splitting network element. The splitting network element is configured to split data flows of applications of the second session.

In another possible implementation, a third session management network element selects a splitting network element, and then the second session management network element may obtain information about the splitting network element from the third session management network element.

In a possible implementation, a third session management network element may further establish a data transmission channel between a splitting network element and a third user plane network element.

In a possible implementation, the second session management network element may obtain splitting policy information, determine a splitting policy based on the splitting policy information, and then send the splitting policy to a splitting network element.

The second session management network element may obtain the splitting policy information from a policy control network element. Alternatively, the second session management network element may further obtain the splitting policy information from the access management network element. Alternatively, the second session management network element may further obtain the splitting policy information from a third session management network element. If the second session management network element obtains the splitting policy information from the policy control network element, before obtaining the splitting policy information from the policy control network element, the second session management network element further needs to obtain information about the policy control network element, for example, identification information of the policy control network element.

According to a fourth aspect, this application provides a session processing method. The method includes: obtaining, by an access management network element, splitting policy information of data flows of applications of a second session; and sending, by the access management network element, the splitting policy information to a second session management network element or a third session management network element that corresponds to the second session. Based on this solution, the access management network element may obtain the splitting policy information of the data flows of the applications of the second session, and then send the splitting policy information to a session management network element such as the second session management network element or the third session management network element. The splitting policy information may be used to generate a splitting policy. The splitting policy may be used to split data flows of applications. The data flows of the applications include a data flow of an application that supports application relocation and/or a data flow of an application that do not support application relocation.

In a possible implementation, obtaining, by an access management network element, splitting policy information of data flows of applications of a second session includes receiving, by the access management network element, access point information that is of an application of a first session and that is from a first session management network element, where the splitting policy information includes the access point information of the application.

In a possible implementation, obtaining, by an access management network element, splitting policy information of data flows of applications of a second session includes: receiving, by the access management network element, a session establishment request message from a terminal, where the session establishment request message includes an identifier of a first session; determining, by the access management network element, session context information based on the identifier of the first session; and determining, by the access management network element, the splitting policy information based on the session context information.

According to a fifth aspect, this application provides a session processing method. The method includes: obtaining, by a session management network element, splitting policy information of data flows of applications of a second session; determining, by the session management network element, a splitting policy based on the splitting policy information; and sending, by the session management network element, the splitting policy to a splitting network element, where the splitting network element is configured to split the data flows of the applications of the second session. Based on this solution, the session management network element may obtain the splitting policy information of the data flows of the applications of the second session, then determine the splitting policy, and send the splitting policy to the splitting network element. In this way, the splitting network element may split data flows of applications according to the splitting policy. The session management network element may be the second session management network element or the third session management network element in the foregoing aspects.

In a possible implementation, the session management network element may obtain the splitting policy information from an access management network element. Alternatively, the session management network element may obtain the splitting policy information from a policy control network element. Alternatively, the session management network element may obtain the splitting policy information from another session management network element.

If the second session management network element obtains the splitting policy information from the policy control network element, before obtaining the splitting policy information from the policy control network element, the second session management network element further needs to obtain information about the policy control network element, for example, identification information of the policy control network element.

In a possible implementation, the session management network element may further select a splitting network element.

In a possible implementation, the access point information of the application according to any one of the implementations of the first aspect to the fifth aspect includes at least one of the following: at least one data network access identifier (DNAI), location information of an application function (AF), an indication of no application relocation possibility, or an indication of no DNAI change.

In a possible implementation, the splitting policy information according to any one of the implementations of the first aspect to the fifth aspect includes at least one of the following: indication information and information about the data flows of the applications. The indication information includes at least one of the following: a local processing indication, at least one DNAI, or relocation capability information. The data flows of the applications include data flows of applications that support application relocation and/or data flows of applications that do not support application relocation.

According to a sixth aspect, this application provides a session processing method, including: receiving, by a first session management network element, access point information of an application of a first session; determining, by the first session management network element based on the access point information of the application, to allocate the first session management network element to a second session, where the first session and the second session correspond to a same data network; receiving, by the first session management network element, a request message, where the request message requests to establish the second session; and allocating, by the first session management network element, a first user plane network element to the second session, where the first user plane network element is configured to transmit, in the second session, a data flow corresponding to the application.

In a possible implementation, the application is an application that does not support a DNAI change.

In a possible implementation, the first session management network element allocates a second user plane network element to the second session. The second user plane network element is configured to transmit, in the second session, a data flow corresponding to an application that supports a DNAI change.

In another possible implementation, the first session management network element sends splitting policy information to a second session management network element. The splitting policy information is used by the second session management network element to allocate the second user plane network element to the second session. The second user plane network element is configured to transmit, in the second session, the data flow corresponding to the application that supports the DNAI change.

In a possible implementation, the access point information of the application includes at least one of the following information: at least one DNAI, location information of an AF, an indication of no application relocation possibility, or an indication of no DNAI change.

In a possible implementation, a mode type of the first session is an SSC mode 3.

In a possible implementation, the method further includes releasing, by the first session management network element, the first session.

In a possible implementation, the second user plane network element in the sixth aspect is an eighth user plane network element in Embodiment 6 of this application, and the second session management network element in the sixth aspect is a sixth session management network element in Embodiment 6 of this application.

According to a seventh aspect, this application provides an apparatus. The apparatus may be an access management network element or a session management network element (for example, a second session management network element or a third session management network element), or may be a chip. The apparatus has a function of implementing the implementations of any one of the first aspect, the second aspect, the third aspect, the fourth aspect, the fifth aspect, or the sixth aspect. The function may be implemented by hardware, or may be implemented by hardware executing corresponding software. The hardware or the software includes one or more modules corresponding to the function.

According to an eighth aspect, an apparatus is provided and includes a processor and a memory. The memory is configured to store a computer-executable instruction. When the apparatus runs, the processor executes the computer-executable instruction stored in the memory, such that the apparatus performs the session processing method according to any one of the first aspect or the possible implementations of the first aspect, the session processing method according to any one of the second aspect or the possible implementations of the second aspect, the session processing method according to any one of the third aspect or the possible implementations of the third aspect, the session processing method according to any one of the fourth aspect or the possible implementations of the fourth aspect, the session processing method according to any one of the fifth aspect or the possible implementations of the fifth aspect, or the session processing method according to any one of the sixth aspect or the possible implementations of the sixth aspect.

According to a ninth aspect, this application further provides a computer-readable storage medium. The computer-readable storage medium stores an instruction. When the instruction is run on a computer, the computer is enabled to perform the methods according to the foregoing aspects.

According to a tenth aspect, this application further provides a computer program product including an instruction. When the computer program product is run on a computer, the computer is enabled to perform the methods according to the foregoing aspects.

According to an eleventh aspect, this application further provides a system. The system includes the access management network element according to any one of the implementations of the first aspect and the third session management network element according to any one of the implementations of the second aspect. Further, the system may further include the second session management network element according to any one of the implementations of the third aspect.

According to a twelfth aspect, this application further provides a system. The system includes the access management network element according to any one of the implementations of the fourth aspect and the session management network element according to any one of the implementations of the fifth aspect.

It should be noted that the second session management network element in Summary of this application may be a second session management network element or a third session management network element in Embodiment 1 of this application. The second user plane network element in Summary of this application may be a second user plane network element in Embodiment 1 of this application.

The second session management network element in Summary of this application may be a second session management network element or a third session management network element in Embodiment 2 of this application. The second user plane network element in Summary of this application may be a second user plane network element in Embodiment 2 of this application.

The second session management network element in Summary of this application may be a fourth session management network element in Embodiment 3 of this application. The second user plane network element in Summary of this application may be a fifth user plane network element in Embodiment 3 of this application.

The second session management network element in Summary of this application may be a fourth session management network element in Embodiment 4 of this application. The second user plane network element in Summary of this application may be a fifth user plane network element in Embodiment 4 of this application.

The second session management network element in Summary of this application may be a sixth session management network element in Embodiment 6 of this application. The second user plane network element in Summary of this application may be an eighth user plane network element in Embodiment 6 of this application.

DESCRIPTION OF EMBODIMENTS

To make the objectives, technical solutions, and advantages of this application clearer, the following further describes this application in detail with reference to the accompanying drawings. A specific operation method in a method embodiment may also be applied to an apparatus embodiment or a system embodiment. In the description of this application, unless otherwise stated, "a plurality of" means two or more than two.

A network architecture and a service scenario that are described in embodiments of this application are intended to describe the technical solutions in the embodiments of this application more clearly, and do not constitute a limitation on the technical solutions provided in the embodiments of this application. A person of ordinary skill in the art may know that with evolution of the network architecture and emergence of a new service scenario, the technical solutions provided in the embodiments of this application are also applicable to similar technical problems.

Figure 1:
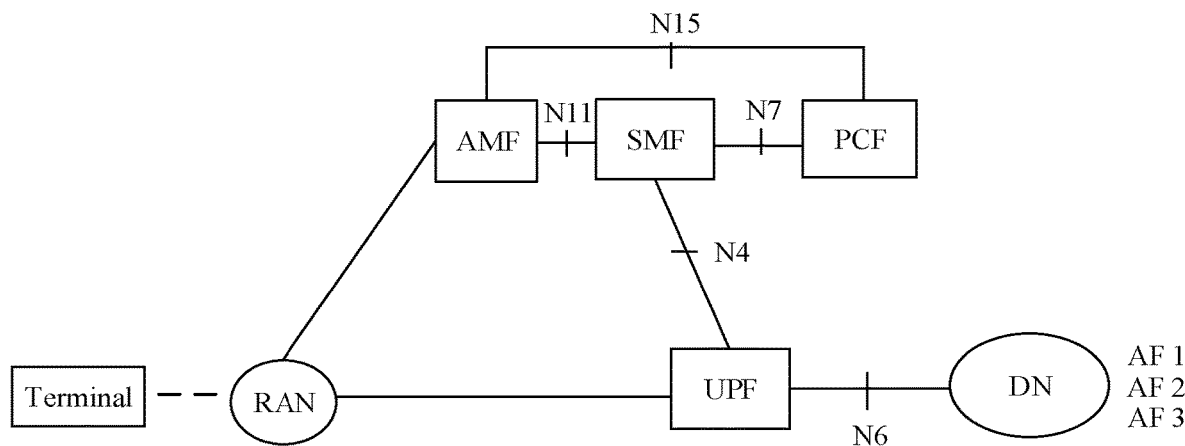
FIG. 1 is a schematic diagram of a possible network architecture according to this application.

FIG. 1 is a schematic diagram of a possible network architecture to which this application is applicable. The network architecture includes an access management network element (in the figure, an example in which the access management network element is an access and mobility management function (AMF) network element is used) and a session management network element (in the figure, an example in which the session management network element is a session management function (SMF) network element is used). Further, the network architecture may further include a user plane network element (in the figure, an example in which the user plane network element is a user plane function (UPF) network element is used). Further, the network architecture may further include a policy control network element (in the figure, an example in which the policy control network element is a policy control function (PCF) network element is used).

The access management network element is mainly used for attachment, mobility management, and a tracking area update process of a terminal in a mobile network. The access management network element terminates a non-access stratum (NAS) message, completes registration management, connection management, reachability management, allocating a tracking area (TA) list, mobility management and the like, and transparently routes a session management (SM) message to the session management network element. In fifth generation (5G) communications, the access and mobility management network element may be the AMF network element. In future communications such as sixth generation (6G) communications, the access management network element may still be the AMF network element, or may have another name. This is not limited in this application.

The session management network element is mainly used for session management, for example, session establishment, modification, and release, in the mobile network. A specific function is, for example, assigning an Internet Protocol (IP) address to the terminal, or selecting a user plane network element that provides a packet forwarding function. In the 5G communications, the session management network element may be the SMF network element. In the future communications such as the 6G communications, the session management network element may still be the SMF network element, or may have another name. This is not limited in this application.

The user plane network element is mainly responsible for processing a user packet. The processing is, for example, forwarding, charging, or lawful interception. The user plane network element may also be referred to as a protocol data unit (PDU) session anchor (PSA). In the 5G communications, the user plane network element may be the UPF network element. In the future communications such as the 6G communications, the user plane network element may still be the UPF network element, or may have another name. This is not limited in this application.

The policy control network element has a subscriber subscription data management function, a policy control function, a charging policy control function, quality of service (QoS) control function, and the like. In the 5G communications, the policy control network element may be the PCF network element. In the future communications such as the 6G communications, the policy control network element may still be the PCF network element, or may have another name. This is not limited in this application.

A core network may include the network elements of the network architecture in this application. The core network and a radio access network (RAN) each may provide a service for the terminal. For example, the terminal may send a data packet to a data network (DN) through the RAN and the core network. Alternatively, a DN sends a data packet to the terminal through the RAN and the core network. When a communication connection is established between the terminal and the DN, a PDU session may be established between the terminal and the DN, to facilitate establishment of a data transmission channel. The PDU session refers to a connection for providing a PDU connection service between the terminal and the DN.

The terminal in this application is a device that has a wireless transceiver function. The terminal may be deployed on land, where the deployment includes indoor or outdoor, or handheld or vehicle-mounted deployment. Alternatively, the terminal may be deployed on water (for example, on a steamer) or may be deployed in air (for example, on an aerocraft, a balloon, and a satellite). The terminal may be a mobile phone, a tablet (pad), a computer having a wireless transceiver function, a virtual reality (VR) terminal, an augmented reality (AR) terminal, a wireless terminal in industrial control, a wireless terminal in self driving, a wireless terminal in a telemedicine (remote medical), a wireless terminal in a smart grid, a wireless terminal in transportation safety, a wireless terminal in a smart city, a wireless terminal in a smart home, and the like.

In an example, an interface between the user plane network element and the DN may be referred to as an N6 interface, an interface between the user plane network element and the session management network element may be referred to as an N4 interface, an interface between the session management network element and the access management network element may be referred to as an N11 interface, an interface between the session management network element and the policy control network element may be referred to as an N7 interface, and an interface between the access management network element and the policy control network element may be referred to as an N15 interface. Certainly, in the future communications, names of these interfaces may be unchanged, or may be replaced with other names. This is not limited in this application.

It may be understood that the foregoing functions may be network elements in a hardware device, or may be software functions run on dedicated hardware, or may be virtualized functions instantiated on a platform (for example, a cloud platform).

For ease of description, this application is subsequently described using an example in which the user plane network element is the UPF network element, the session management network element is the SMF network element, the access management network element is the AMF network element, and the policy control network element is the PCF network element. Further, the UPF network element is referred to as a UPF for short, the SMF network element is referred to as an SMF for short, the AMF network element is referred to as an AMF for short, and the PCF network element is referred to as a PCF for short. To be more specific, in subsequent description of this application, all UPFs may be replaced with user plane network elements, all SMFs may be replaced with session management network elements, all AMFs may be replaced with access management network elements, and all PCFs may be replaced with policy control network elements.

To facilitate understanding of the solutions, the following briefly describes some terms or nouns to be used in this application and corresponding background knowledge.

A session and service continuity mode in a 5G system can meet continuity requirements of different applications or services. Different session and service continuity modes are supported in the 5G system, and mainly include the following several session and service continuity modes.

(1) SSC mode 1: In a moving process of the terminal, regardless of an access technology type of the terminal, a location of the terminal, and the like, when a PDU session is established, a UPF used as a PSA remains unchanged.

(2) SSC mode 2: Based on information such as a policy of an operator, a network side may instruct the terminal to release a current PDU session and reestablish a new PDU session. In the newly established PDU session, a UPF used as a PSA may be reselected.

(3) SSC mode 3: For a PDU session in the SSC mode 3, a network side allows establishment of a new PDU session for a DN of the PDU session. After the establishment of the new PDU session is completed, the network side may release the previously established PDU session after a specific time. There are a plurality of conditions under which the network side allows the establishment of the new PDU session for the DN of the PDU session. For example, the network side allows the establishment of the new PDU session for the DN of the PDU session because of movement of the terminal or load balancing of a device.

Figure 2:
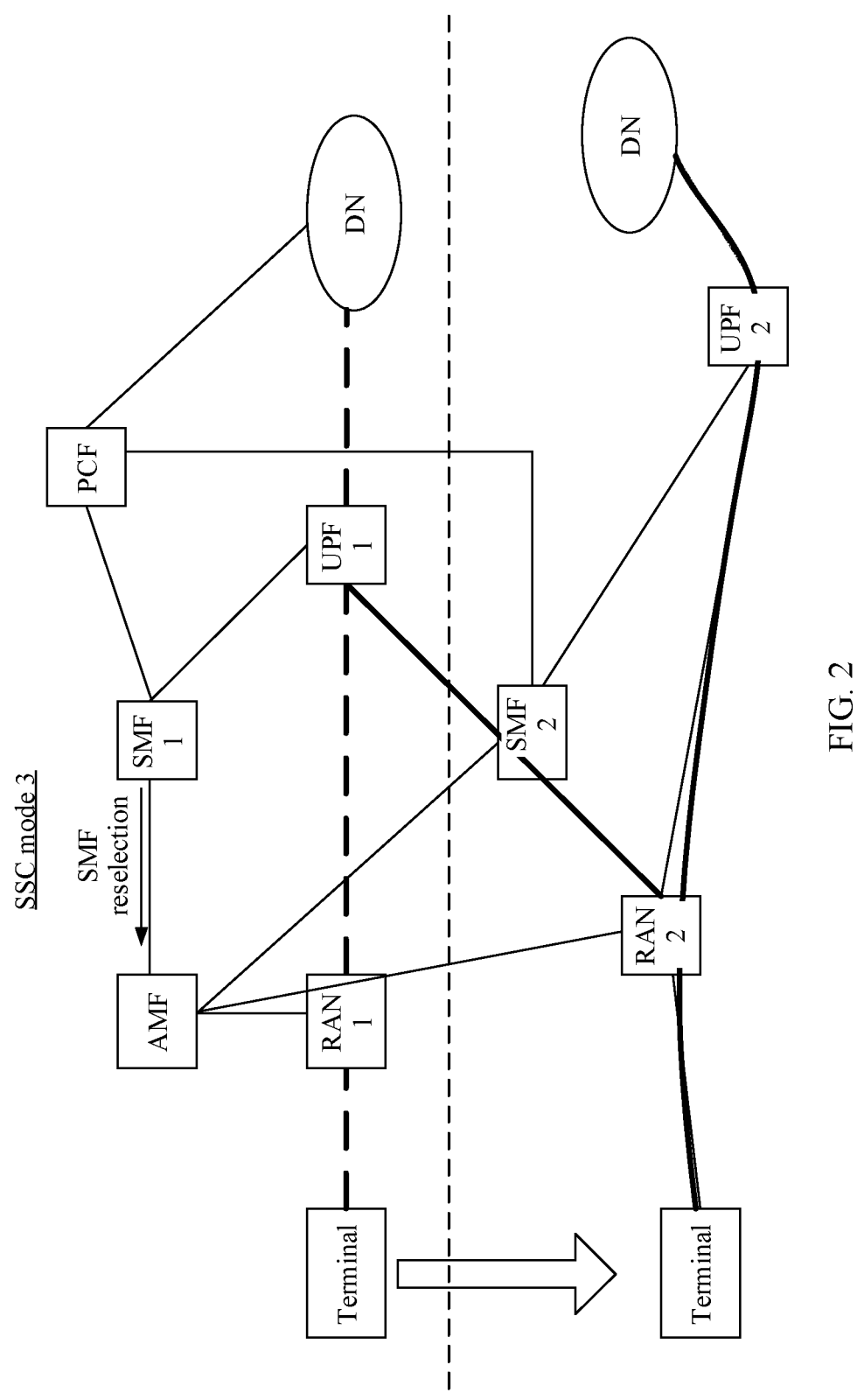
FIG. 2 is a schematic diagram of a PDU session in an SSC mode 3 in other approaches.

FIG. 2 is a schematic diagram of a PDU session in an SSC mode 3 in other approaches. It should be noted that two DNs in FIG. 2 are a same DN.

A terminal establishes a PDU session 1 (as shown by a dashed line in the figure) at a location 1 (a location shown by a RAN 1). A user plane path of the PDU session 1 is: the terminal-the RAN 1-a UPF 1.

When the terminal moves to a location 2 (a location shown by a RAN 2), the terminal accesses the RAN 2. In this case, the PDU session 1 still exists, and the user plane path of the PDU session 1 is updated to: the terminal-the RAN 2-the UPF 1. In addition, after the terminal moves, an SMF 1 may send a NAS message to the terminal using an AMF, to instruct the terminal to establish a PDU session 2 for the DN. A user plane path of the PDU session 2 is: the terminal-the RAN 2-*a* UPF 2.

In the foregoing process, if an area in which a terminal such as a user equipment (UE) is located is not within a coverage area of the SMF 1, or a UPF managed by the SMF 1 has a coverage area and a location of the UE is not within the coverage area of the UPF managed by the SMF 1, the SMF 1 may instruct the AMF to reselect an SMF. For example, when the terminal initiates PDU session establishment, the AMF may reselect an SMF 2, and then the SMF 2 reselects the UPF 2, and establishes a PDU session. The PDU session is the PDU session 2.

Therefore, for the PDU session in the SSC mode 3, the old PDU session 1 still exists within a period of time after the PDU session 2 is newly established. In addition, when a PDU session is newly established, the AMF may reselect an SMF, and the reselected SMF may reselect a UPF. FIG. 2 shows a reselection scenario. Before the terminal moves, network elements each providing a service for the terminal are the SMF 1 and the UPF 1. After the terminal moves, network elements each providing a service for the terminal are the SMF 2 and the UPF 2. Further, after the terminal moves, the AMF providing a service for the terminal may also be changed. For ease of description, an example in which the AMF is unchanged is used for description in this application.

This application mainly relates to the SSC mode 1 and the SSC mode 3. Two scenarios are separately described subsequently.

Referring to FIG. 1, it is assumed that in the DN, there are three application function (AF) servers, namely, an AF server 1, an AF server 2, and an AF server 3. For ease of description, the AF server is referred to as an AF for short subsequently. Therefore, the AF server 1, the AF server 2, and the AF server 3 may be referred to as an AF 1, an AF 2, and an AF 3 for short respectively. The AF 1 includes an application 1, or it is understood as that the AF 1 corresponds to an application 1. The AF 2 includes an application 2, or it is understood as that the AF 2 corresponds to an application 2. The AF 3 includes an application 3, or it is understood as that the AF 3 corresponds to an application 3. The terminal is currently located at a location A. The terminal may access the AF 1, the AF 2, and the AF 3 at the location A. Therefore, the terminal may access the application 1, the application 2, and the application 3 at the location A.

It is assumed that the application 1 does not support application relocation. It may also be understood as that when the terminal is at the location A and performs a service of the application 1, the terminal is connected to the AF 1. Then, when the location of the terminal changes (for example, when the terminal moves to another location B), the AF 1 expects the terminal to still access the AF 1 when the terminal performs the service of the application 1. For example, an AF corresponding to the application 1 is not deployed at the location B, or although an AF corresponding to the application 1 is deployed at the location B, an application layer of the AF does not support an operation such as context transfer on the application layer. Therefore, the terminal still needs to access the AF 1 that corresponds to the application 1 and that is accessed by the terminal at the location A.

It is assumed that the application 2 and the application 3 support application relocation. It may also be understood that after leaving the location A, at a new location (for example, the location B) after moving, the terminal may be connected to an AF other than the AF 2 to perform a service of the application 2, and may be connected to an AF other than the AF 3 to perform a service of the application 3.

After the terminal moves to the location B, to perform the service of the application 1 at the location B, the terminal needs to be connected to the AF 1 that corresponds to the application 1 and that is located at the location A. Therefore, in this scenario, to provide relatively good service experience for the terminal, that a gateway device (for example, including a user plane network element and a splitting network element) of a session needs to determine, based on a location of the AF 1, how to select a session management network element and how the session management network element selects a gateway device are problems to be resolved in this application.

For the foregoing problems, this application provides a plurality of different solutions separately described below.

Embodiment 1

Figure 3A:
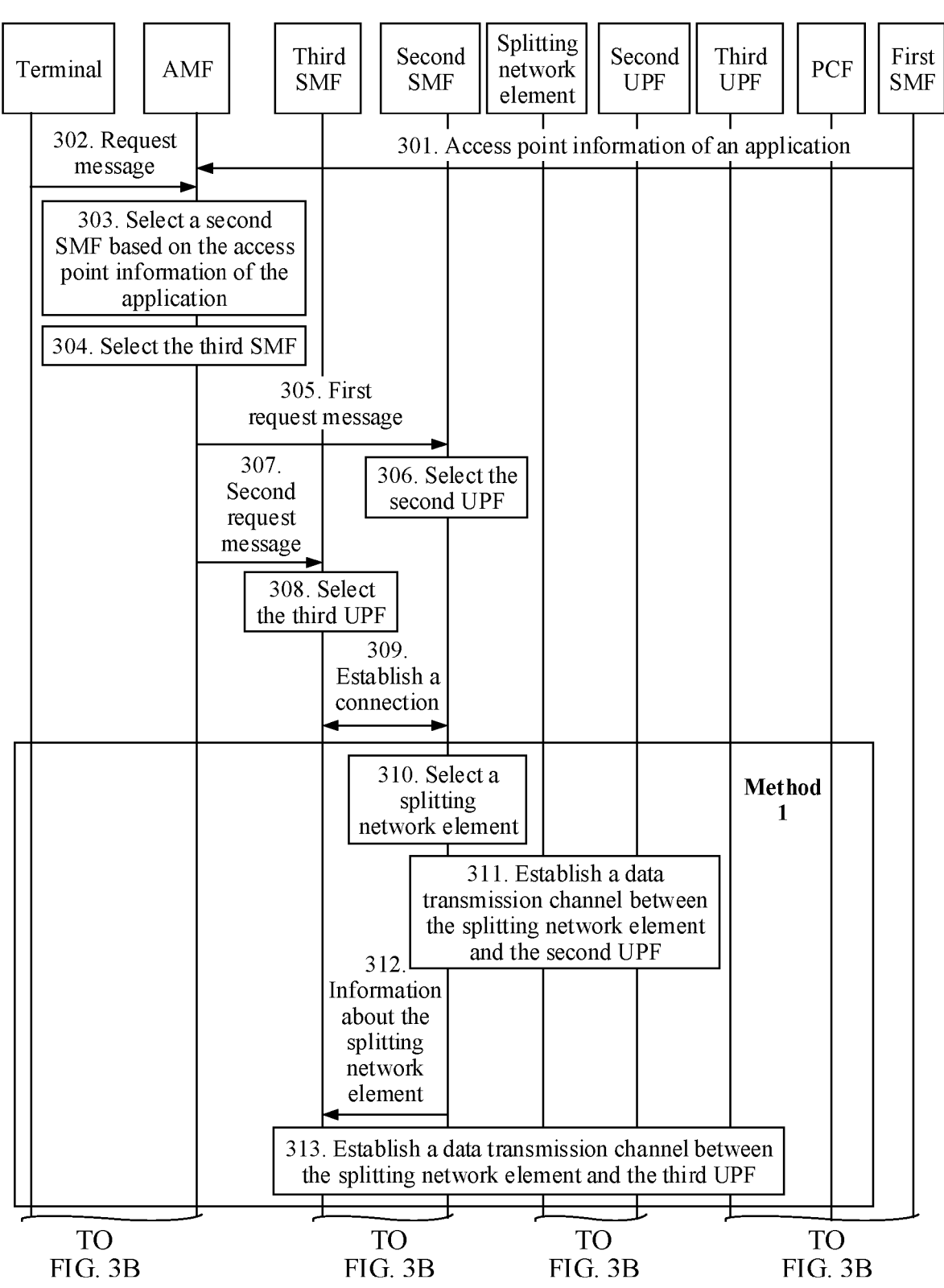
FIG. 3A and FIG. 3B are flowcharts of a session processing method according to this application.
Figure 3B:
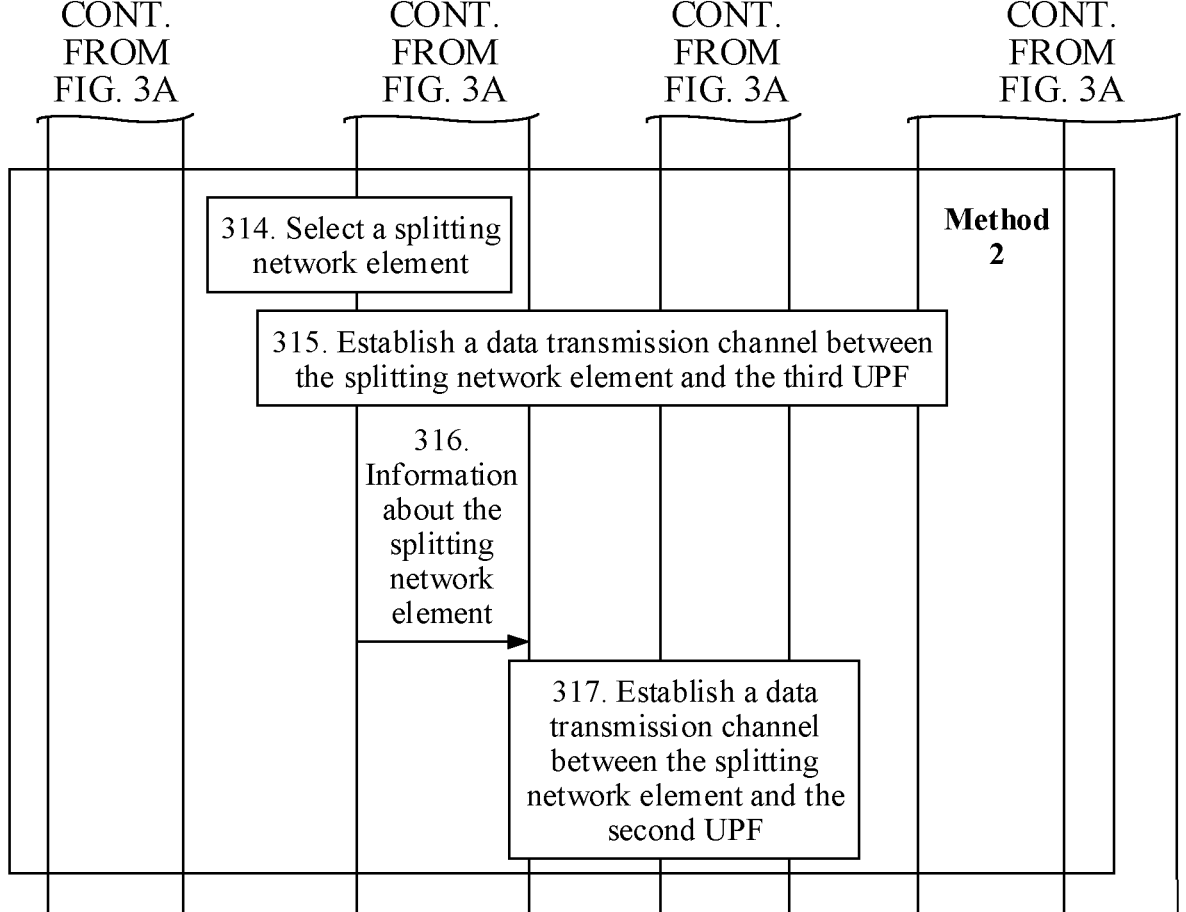

FIG. 3A and FIG. 3B are flowcharts of a session processing method according to this application. The method is applied to a processing process of a session in an SSC mode 3. In this embodiment, a session established by a terminal before the terminal moves is referred to as a first session, and an SMF providing a service for the terminal is referred to as a first SMF. A session established by the terminal after the terminal moves is referred to as a second session. SMFs each providing a service for the terminal include a second SMF and a third SMF. A UPF selected by the second SMF is referred to as a second UPF. The second UPF is configured to route a data flow of a second application of the second session. The second application is an application that does not support application relocation. For example, the second application may be the application corresponding to the AF 1 in FIG. 1. A UPF selected by the third SMF is referred to as a third UPF. The third UPF is configured to route a data flow of a first application of the second session. The first application is an application that supports application relocation. For example, the first application may be the application corresponding to the AF 2 or the AF 3 in FIG. 1. Before the terminal moves and after the terminal moves, AMFs each providing a service for the terminal are a same AMF. In addition, the second SMF selected by the AMF in this embodiment and the first SMF are different SMFs.

It should be noted that in this embodiment, the first SMF may also be referred to as an A-SMF 1, the second SMF may also be referred to as an A-SMF 2, and the third SMF may also be referred to as an I-SMF. The A-SMF is an acronym of an anchor SMF, the I-SMF is an acronym of an intermediate SMF, and the I-SMF is a newly added SMF.

The method includes the following steps.

Step 301: The first SMF sends access point information of an application of a first session to the AMF. Correspondingly, the AMF may receive the access point information of the application of the first session.

The access point information of the application includes at least one of the following: at least one DNAI, location information of an AF, an indication of no application relocation possibility, or an indication of no DNAI change.

It should be noted that in another implementation, access point information of an application that appears anywhere in this application may be further replaced with indication information. Further, a corresponding operation performed by any network element based on the access point information of the application may be replaced with a corresponding operation performed by the network element based on the indication information.

The DNAI is an identifier of a data network access point, and may be considered as location information of a data access network. For example, in a scenario, because of load balancing, an AF server may request a data routing access point to be at a specific location (where the AF server is deployed at the location for the application). To be more specific, a data flow of the application of a user is expected to be sent to the AF server at the location. The AF server may provide the location information of the AF to a network exposure function (NEF) network element on a network side. The NEF maps the location information of the AF into one or more DNAIs, and sends the one or more DNAIs to an SMF using a PCF. The SMF selects one or more DNAIs from the DNAIs received by the SMF. Then the SMF may select a UPF based on the one or more selected DNAIs. To be more specific, the DNAI may be used by the SMF to select the UPF. In this application, the DNAI may be further used by the AMF to select the SMF.

The indication of no application relocation possibility (not application relocation possibility) is used to indicate that an application of the AF does not support application relocation.

The indication of no DNAI change is used to indicate that the one or more DNAIs corresponding to the location information of the AF cannot change. When the application of the AF does not support application relocation, a gateway device that transmits an application data flow of the AF may correspond to the one or more DNAIs.

For example, if an application does not support application relocation, an AF corresponding to the application may send the DNAI to the SMF using the NEF or the PCF. It should be noted that the AF may further send location information of the AF to the NEF. The NEF may determine access point information of the application (where the access point information herein may be one or more DNAIs) based on the location information of the AF. The NEF may send the access point information of the application to the first SMF using the PCF. After the first SMF receives the access point information of the application, on one hand, the first SMF may store the access point information of the application in session context information of the first session of the terminal. The session context information herein is information, related to the session, of the terminal. On the other hand, the first SMF may further send the access point information of the application to the AMF. To be more specific, after obtaining the access point information of the application, the first SMF includes the access point information in a message, and sends the message to the AMF. A specific message is not limited, and may be, for example, a Namf_Communication_N1N2_MessageTransfer message.

For example, after obtaining the access point information of the application, the first SMF first stores the information. When the first SMF determines to perform relocation of the SMF and/or the UPF, the first SMF may send a message (for example, the Namf_Communication_N1N2_MessageTransfer message) to the AMF. The message includes an identifier of the first session (where the identifier of the first session may be, for example, an identifier of a PDU session), and an SMF reallocation requested indication, an N1 session management container (N1 SM container), and the like. The N1 SM container is information sent to the terminal, and includes a session modification command (for example, a PDU Session Modification Command), and may further include a cause value. The cause value is used to be sent to the terminal, and instruct the terminal to reestablish a session for a same DN, to be more specific, establish the second session.

The message may further include the access point information of the application. According to the foregoing method, the AMF may obtain the access point information of the application from the first SMF. The AMF may then locally store the access point information, for example, the AMF may store the access point information in the session context information of the first session.

Step 302: The terminal sends a request message to the AMF. Correspondingly, the AMF may receive the request message. The request message includes the identifier of the first session and an identifier of the second session. The request message requests to establish a session.

Movement of the terminal triggers the terminal to initiate session reestablishment. Therefore, the terminal sends the request message to the AMF, to request to establish a session. Herein, the new session that is requested to be established is the second session.

The terminal initiates a session establishment process, and a request message includes the identifier of the first session and the identifier of the second session. For example, when the session is a PDU session, the identifier of the first session may be further referred to as an old PDU session identifier (old PDU session ID), and the identifier of the second session may be further referred to as a new PDU session identifier (new PDU session ID). After receiving the identifier of the first session and the identifier of the second session, the AMF may determine that the second session is a PDU session reestablished based on the first session. Therefore, the AMF reselects an SMF for the second session. In this embodiment, the AMF selects two SMFs, namely, the second SMF and the third SMF, for the second session. In addition, both the selected second SMF and the selected third SMF are different from the first SMF providing a service for the second session.

During implementation, the request message may be a session establishment request message.

Step 303: The AMF selects the second SMF based on the access point information of the application.

The AMF selects the second SMF based on the access point information of the application. The second SMF selects the second UPF. The second UPF is configured to route the data flow of the second application of the second session. The second application is an application that does not support application relocation. For example, the second application may be the application corresponding to the AF 1 in FIG. 1.

Step 304: The AMF selects the third SMF.

For example, the AMF may select the third SMF based on location information of the terminal and/or information about the second SMF. The third SMF selects the third UPF. The third UPF is configured to route the data flow of the first application of the second session. The first application is an application that supports application relocation. For example, the first application may be the application corresponding to the AF 2 or the AF 3 in FIG. 1.

Step 305: The AMF sends a first request message to the second SMF, where the first request message requests to establish the second session. Correspondingly, the second SMF may receive the first request message.

During implementation, the first request message may be, for example, an Nsmf_PDUSession_CreateSMContext Request message.

Optionally, the first request message includes the access point information of the application, and the access point information of the application is used by the second SMF to select a UPF.

Optionally, the first request message may further include the identifier of the first session and the identifier of the second session.

Step 306: The second SMF selects the second UPF.

In an implementation, if the first request message includes the access point information of the application, the second SMF may select a UPF based on the access point information of the application, and the selected UPF is the second UPF. Because the UPF is selected based on the access point information of the application, the selected second UPF enables the terminal to access an AF server corresponding to the application. To be more specific, after moving, the terminal can still access the application that does not support application relocation. The second UPF corresponds to one or more DNAIs. The one or more DNAIs correspond to the AF server corresponding to the application.

In another implementation, the second SMF may obtain splitting policy information, and select a UPF based on the splitting policy information, and the selected UPF is the second UPF.

It should be noted that the second UPF selected by the second SMF and an anchor UPF (which may be referred to as a first UPF) corresponding to the first session may be a same UPF, or may be different UPFs. This is not limited in this application.

Step 307: The AMF sends a second request message to the third SMF, where the second request message requests to establish the second session. Correspondingly, the third SMF may receive the second request message.

During implementation, the second request message may be, for example, an Nsmf_PDUSession_CreateSMContext Request message. The second request message includes the information about the second SMF, such that the second SMF and the third SMF establish a PDU session (that is, the second session) for UE. The information about the second SMF is used by the third SMF to establish a connection to the second SMF.

Optionally, the AMF may determine, based on the access point information of the application, to add the information about the second SMF to the second request message.

Step 308: The third SMF selects the third UPF.

For example, the third SMF may select a UPF according to a UPF selection principle, for example, based on information such as the location information of the terminal, load information of the UPF, and a data network name (DNN), and the selected UPF is the third UPF. The third UPF is configured to route the data flow of the first application of the second session. The first application is an application that supports application relocation.

Step 309: The third SMF establishes the connection to the second SMF based on the information about the second SMF, where the connection is used to transmit splitting information of data flows of applications of the second session.

The splitting information may include, for example, information about a splitting network element and/or splitting policy information, and may further include information about the PCF and the like. The information about the second SMF may be, for example, identification information of the second SMF.

In an implementation, the third SMF may send an Nx message to the second SMF based on the information about the second SMF, and the Nx message requests to establish a signaling connection to the second SMF.

Further, a splitting network element further needs to be selected. The splitting network element is a device configured to split the data flows of the applications of the second session, and may determine corresponding data routes (to be more specific, select different gateway devices) for the data flows based on features of the data flows. For example, the data flow of the first application of the second session is sent to the third UPF, and the data flow of the second application of the second session is sent to the second UPF.

In an implementation, a specific form of the splitting network element is not limited, and may be an uplink classifier (UL CL). The UL CL may be a UPF. The splitting network element splits service data flows. For uplink data flows, when the uplink data flows reach the splitting network element, the splitting network element matches a splitting policy with the uplink data flows, and sends the uplink data flows to the second UPF or the third UPF. For downlink data flows, the splitting network element merges the uplink data flows and sends the uplink data flows to the terminal. In such a processing manner, there may be a plurality of data flow routing points in one PDU session.

The following describes two methods for selecting a splitting network element.

Method 1: That the second SMF selects a splitting network element includes the following step 310 to step 313.

Step 310: The second SMF selects a splitting network element.

A method for selecting a splitting network element by the second SMF is not limited in this application. For example, the second SMF may select a splitting network element based on a part or all of information such as the location information of the terminal, the identifier of the first session, and the identifier of the second session.

Step 311: The second SMF establishes a data transmission channel between the splitting network element and the second UPF.

Step 312: The second SMF sends information about the splitting network element to the third SMF.

For example, the second SMF may send identification information of the splitting network element and the like to the third SMF. For example, the second SMF may send the information about the splitting network element to the third SMF through the connection established in step 309.

Step 313: The third SMF establishes a data transmission channel between the splitting network element and the third UPF.

Method 2: That the third SMF selects a splitting network element includes the following step 314 to step 317.

Step 314: The third SMF selects a splitting network element.

A method for selecting a splitting network element by the third SMF is not limited in this application. For example, the third SMF may select a splitting network element based on a part or all of information such as the location information of the terminal, the identifier of the first session, and the identifier of the second session.

Step 315: The third SMF establishes a data transmission channel between the splitting network element and the third UPF.

Step 316: The third SMF sends information about the splitting network element to the second SMF.

For example, the third SMF may send identification information of the splitting network element and the like to the second SMF. For example, the third SMF may send the information about the splitting network element to the second SMF through the connection established in step 309.

Step 317: The second SMF establishes a data transmission channel between the splitting network element and the second UPF.

Using step 310 to step 313, or using step 314 to step 317, a splitting network element is selected. Further, the second SMF may establish a connection between the splitting network element and the second UPF, and the third SMF may establish a connection between the splitting network element and the third UPF. In this way, the splitting network element can send received data flows of applications to the second UPF or the third UPF respectively.

It should be noted that in the foregoing steps, there is no strict performing sequence between steps having no time sequence dependency relationship between each other. For example, there is no strict sequence between any one of step 303, step 305, and step 306 and any one of step 304, step 307, and step 308, as long as it is ensured that step 303 is performed before step 307, and step 309 may be performed after step 307, and may be performed before step 312 or step 316. If step 310 to step 313 are performed, step 311 may be performed after step 310. If step 314 to step 317 are performed, step 315 may be performed after step 314. Performing manners of other steps that have no time sequence limitation may be adjusted based on an actual case. Examples are not used one by one again for description.

According to the foregoing embodiment, the second UPF may be selected. The second UPF is configured to route the data flow of the second application of the second session. The second application is an application that does not support application relocation. In this way, after moving, the terminal can still access the second application using the second session.

In the foregoing embodiment, a possible reason for a need to select two SMFs for the second session is as follows. The third SMF selected by the AMF based on information such as a location of the terminal is relatively far away from an AF server corresponding to the application that does not support application relocation. Therefore, the third SMF cannot manage and control a UPF corresponding to a DNAI corresponding to the AF server. Therefore, one more SMF, namely, the second SMF, needs to be selected, to select the second UPF and manage the second UPF.

Further, when splitting the received data flows of the applications, the splitting network element needs to split the data flows according to the received splitting policy. The data flows of the applications include data flows of applications that support application relocation and/or data flows of applications that do not support application relocation. The following further describes an implementation method for obtaining the splitting policy by the splitting network element. It should be noted that any one of the following methods may be implemented with reference to the embodiment shown in FIG. 3A and FIG. 3B, or may be implemented separately, which is not limited.

The following describes the implementation methods using an example in which the following methods are implemented with reference to the embodiment shown in FIG. 3A and FIG. 3B.

Implementation method 1: The AMF obtains splitting policy information and sends the splitting policy information to the second SMF or the third SMF, and then the second SMF or the third SMF determines a splitting policy based on the splitting policy information and sends the splitting policy to the splitting network element.

Figure 4:
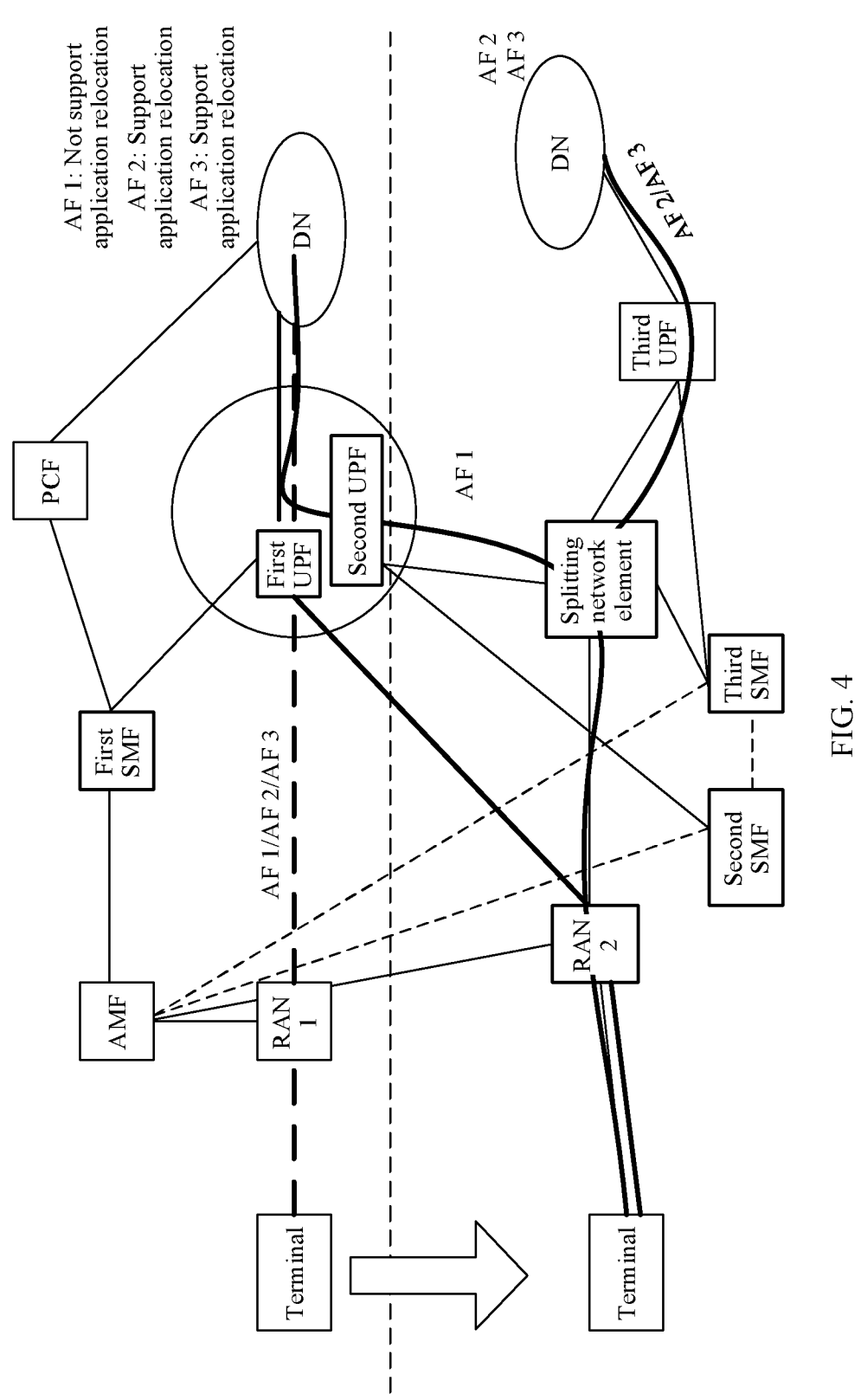
FIG. 4 is a schematic diagram of data flows of a session according to this application.
Figure 5:
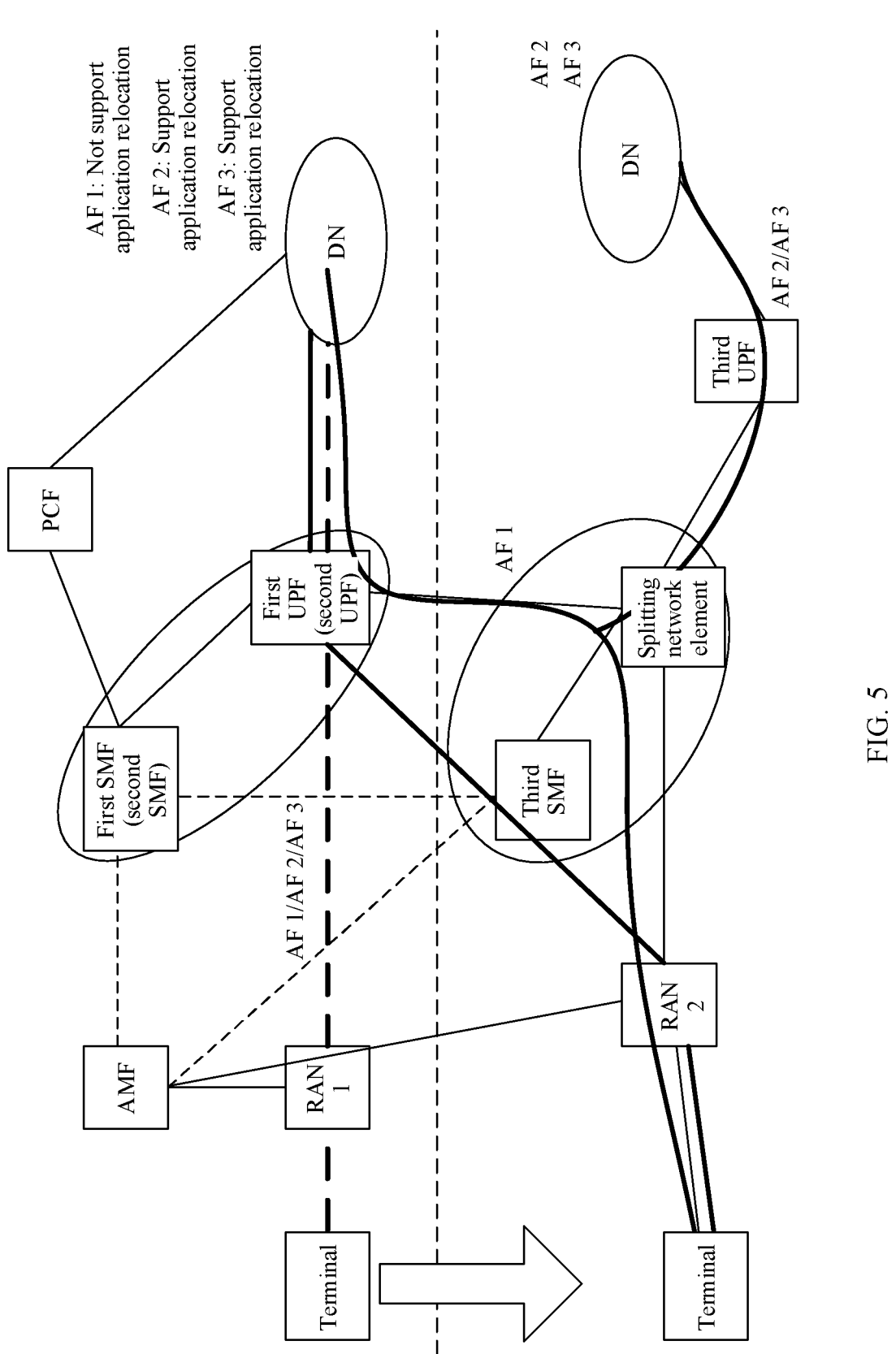
FIG. 5 is another schematic diagram of data flows of a session according to this application.

The splitting policy information is information used to determine data flow routes. In a same PDU session, data flows with different features may be sent to a DN through different UPFs, as shown in FIG. 2, FIG. 4, FIG. 5, and the like. In other words, in the same PDU session, different data routes exist for the data flows. Then all information used to determine the data routes for the data flows may be referred to as the splitting policy information.

The splitting policy information may include, for example, the indication information and/or information about the data flows of the applications. The indication information includes at least one of the following: a local processing indication, at least one DNAI, or relocation capability information. The data flows of the applications include the data flows of the applications that support application relocation and/or the data flows of the applications that do not support application relocation. The relocation capability information includes the indication of no application relocation possibility (not application relocation possibility) or an indication of an application relocation possibility. The information about the data flows of the applications includes at least one of a destination IP address of the data flows of the applications, an identifier of the AF, or identifiers of the applications.

For example, in the step of the embodiment shown in FIG. 3A and FIG. 3B, when sending the access point information of the application to the AMF, the first SMF may further send the splitting policy information to the AMF. It should be noted that if the access point information and the splitting policy information are each the at least one DNAI or the indication of no application relocation possibility, the first SMF needs to send the at least one DNAI or the indication of no application relocation possibility to the AMF only once instead of repeatedly.

Alternatively, in another implementation, the first SMF may send the access point information and the splitting policy information of the applications to the AMF using different messages respectively.

After receiving the splitting policy information, the first SMF may alternatively store the splitting policy information in the session context information of the first session.

Further, the first SMF may send the splitting policy information to the AMF. In an implementation, the first SMF may send the splitting policy information to the AMF using a message. A specific message is not limited, and may be, for example, the Namf_Communication_N1N2_MessageTransfer message. In this way, the AMF may obtain the splitting policy information. Further, the AMF may locally store the splitting policy information, for example, the AMF may store the splitting policy information in the session context information of the first session.

In an implementation, after step 302 of the embodiment shown in FIG. 3A and FIG. 3B, the AMF determines the session context information based on the identifier of the first session in the received request message. The AMF then determines the splitting policy information based on the session context information, to be more specific, the AMF obtains the stored splitting policy information from the session context information.

After obtaining the splitting policy information, the AMF may send the splitting policy information to the second SMF or the third SMF. For example, if the splitting network element is selected by the second SMF, the AMF may send the splitting policy information to the second SMF. Alternatively, the AMF may send the splitting policy information to the third SMF, and the third SMF sends the splitting policy information to the second SMF. Then the second SMF generates the splitting policy based on the splitting policy information, and sends the splitting policy to the splitting network element. If the splitting network element is selected by the third SMF, the AMF may send the splitting policy information to the third SMF. Alternatively, the AMF may send the splitting policy information to the second SMF, and the second SMF sends the splitting policy information to the third SMF. Then the third SMF generates the splitting policy based on the splitting policy information, and sends the splitting policy information to the splitting network element.

It should be noted that the second SMF or the third SMF may directly use the splitting policy information as the splitting policy. To be more specific, the splitting policy is the same as the splitting policy information. Alternatively, the second SMF or the third SMF may further add related information to the splitting policy information or modify related information of the splitting policy information to obtain the splitting policy. In this case, the splitting policy and the splitting policy information are not completely the same. For example, the splitting policy is implemented based on an actual requirement. During implementation, the splitting policy may be, for example, a filter.

Implementation method 2: The second SMF obtains splitting policy information from the PCF. The second SMF then determines a splitting policy based on the splitting policy information and sends the splitting policy to the splitting network element.

In an implementation, if a PCF corresponding to the second SMF and a PCF (where the PCF may also be referred to as a PCF corresponding to the first session) corresponding to the first SMF are a same PCF, the second SMF stores information about the PCF, and therefore, may obtain the splitting policy information from the PCF.

In another implementation, if a PCF corresponding to the second SMF and a PCF corresponding to the first SMF are not a same PCF, the second SMF first needs to obtain information about the PCF corresponding to the first SMF. For example, the second SMF may obtain the information about the PCF corresponding to the first SMF from the AMF (where the information about the PCF corresponding to the first SMF on the AMF may be from the first SMF to the AMF). Then, the second SMF obtains the splitting policy information from the PCF based on the obtained information about the PCF. For example, the AMF may add the information about the PCF to the first request message in step 305 of the embodiment shown in FIG. 3A and FIG. 3B, and send the first request message to the second SMF.

After obtaining the splitting policy information, the second SMF determines the splitting policy based on the splitting policy information. For an implementation, refer to related descriptions in the implementation method 1. Details are not described herein again.

Implementation method 3: The second SMF obtains splitting policy information from the PCF, and then sends the splitting policy information to the third SMF. The third SMF determines a splitting policy based on the splitting policy information and sends the splitting policy to the splitting network element.

A main difference from the implementation method 2 lies in that in the implementation method 3, after obtaining the splitting policy information from the PCF, the second SMF sends the splitting policy information to the third SMF. Then the third SMF determines the splitting policy based on the splitting policy information and sends the splitting policy to the splitting network element.

It should be noted that the splitting policy information obtained by the second SMF from the PCF may be the same as or different from the splitting policy information from the second SMF to the third SMF. For example, the splitting policy information obtained by the second SMF from the PCF may be identifiers of application data flows and corresponding DNAIs of the application data flows. The second SMF may send the identifiers of the application data flows and the corresponding DNAIs of the application data flows to the third SMF. Values may be different. For another example, the splitting policy information obtained by the second SMF from the PCF includes identifiers of application data flows and indication information of no application relocation possibility. Then the second SMF determines DNAIs of the application data flows based on the splitting policy information. Then, the second SMF uses the identifiers of the application data flows and the DNAIs of the application data flows as the splitting policy information and sends the splitting policy information to the third SMF.

The splitting policy information from the second SMF to the third SMF may be the same as or different from the splitting policy determined by the third SMF. For example, the splitting policy information from the second SMF to the third SMF includes identifiers of application data flows and corresponding DNAIs. The third SMF may determine a splitting policy of the application data flows based on the identifiers of the application data flows and the corresponding DNAIs. The splitting policy may include the identifiers of the data flows (for example, destination addresses of the application data flows) and corresponding routes (for example, addresses of gateway devices to which the application data flows are routed). The third SMF may send the splitting policy to the splitting network element.

Implementation method 4: The third SMF obtains splitting policy information from the PCF. The third SMF then determines a splitting policy based on the splitting policy information and sends the splitting policy to the splitting network element.

A main difference from the implementation method 2 lies in that in the implementation method 4, the third SMF obtains the splitting policy information from the PCF. For an obtaining manner, refer to a manner in which the second SMF obtains the splitting policy information from the PCF. After obtaining the splitting policy information, the third SMF determines the splitting policy based on the splitting policy information. For an implementation, refer to related descriptions in the implementation method 1. Details are not described herein again.

In an implementation, if the third SMF further needs to obtain information about the PCF, the AMF may add the information about the PCF to the second request message in step 307 of the embodiment shown in FIG. 3A and FIG. 3B, and send the second request message to the third SMF.

It should be noted that the splitting policy information obtained by the third SMF from the PCF may be the same as or different from the splitting policy determined by the third SMF. For example, the splitting policy information obtained by the third SMF from the PCF includes identifiers of application data flows and corresponding DNAIs. The third SMF may determine a splitting policy of the application data flows based on the identifiers of the application data flows and the corresponding DNAIs. The splitting policy may include the identifiers of the data flows (for example, destination addresses of the application data flows) and corresponding routes (for example, addresses of gateway devices to which the application data flows are routed). The third SMF may send the splitting policy to the splitting network element.

Implementation method 5: The third SMF obtains splitting policy information from the PCF, and then sends the splitting policy information to the second SMF. The second SMF determines a splitting policy based on the splitting policy information and sends the splitting policy to the splitting network element.

A main difference from the implementation method 4 lies in that in the implementation method 5, after obtaining the splitting policy information from the PCF, the third SMF sends the splitting policy information to the second SMF. Then the second SMF determines the splitting policy based on the splitting policy information and sends the splitting policy to the splitting network element.

It should be noted that the splitting policy information obtained by the third SMF from the PCF may be the same as or different from the splitting policy information from the third SMF to the second SMF. For example, the splitting policy information obtained by the third SMF from the PCF may be identifiers of application data flows and corresponding DNAIs of the application data flows. The third SMF may send the identifiers of the application data flows and the corresponding DNAIs of the application data flows to the second SMF. Values may be different. For another example, the splitting policy information obtained by the third SMF from the PCF includes identifiers of application data flows and indication information of no application relocation possibility. Then the third SMF determines DNAIs of the application data flows based on the splitting policy information. Then, the third SMF uses the identifiers of the application data flows and the DNAIs of the application data flows as the splitting policy information and sends the splitting policy information to the second SMF.

The splitting policy information from the third SMF to second SMF may be the same as or different from the splitting policy determined by the second SMF. For example, the splitting policy information from the third SMF to the second SMF includes identifiers of application data flows and corresponding DNAIs. The second SMF may determine a splitting policy of the application data flows based on the identifiers of the application data flows and the corresponding DNAIs. The splitting policy may include the identifiers of the data flows (for example, destination addresses of the application data flows) and corresponding routes (for example, addresses of gateway devices to which the application data flows are routed). The second SMF may send the splitting policy to the splitting network element.

For the implementation method 2 to the implementation method 4, the information about the PCF in the AMF may be obtained by the AMF using the following method. In step 301, when sending the information about the access point of the application to the AMF, the first SMF may further send the information about the PCF to the AMF. For example, the information about the PCF may be added to the Namf_Communication_N1N2_MessageTransfer message and sent to the AMF. Alternatively, in another implementation, step 301 may be replaced with: sending, by the first SMF, information about the PCF to the AMF. Correspondingly, the AMF may receive the information about the PCF. To be more specific, the first SMF does not send the access point information to the AMF, but sends the information about the PCF. Then, after receiving the information about the PCF, the AMF may obtain the access point information from the PCF.

The following provides an implementation method, used by the second SMF or the third SW to determine a splitting policy.

Step 1: If an application does not support application relocation, an AF corresponding to the application may send an indication of no application relocation possibility, location information of the AF, and feature information of data flows to an NEF.

The indication of no application relocation possibility is used to indicate that the application does not support application relocation.

The location information of the AF is used to identify a location of the AF.

The feature information of the data flows is used to identify features of the data flows, and includes, for example, a 3-tuple (including a destination IP address, a destination port number, and a protocol type), a 5-tuple (a destination IP address, a destination port number, a source IP address, a source port number, and a protocol type), or an application identifier (including, for example, all or a part of uniform resource locator (URL) information, for example, a host name).

Step 2: The NEF generates at least one DNAI based on the location information of the AF and the feature information of the data flows, sends the at least one generated DNAI to a PCF, and sends the feature information of the data flows to the PCF.

The PCF includes splitting policy information. For example, the splitting policy information on the PCF includes the at least one DNAI and the feature information of the data flows.

Step 3: The AMF/second SW/third SW/first SW obtains the splitting policy information from the PCF.

The splitting policy information from the PCF to the AMF, the second SMF, the third SMF, or the first SW includes the at least one DNAI and the feature information of the data flows, and may further include other information.

Step 4: The second SW/third SMF generates the splitting policy based on the splitting policy information.

If in step 3, the AMF or the first SW obtains the splitting policy information from the PCF, the second SW or the third SW further needs to obtain the splitting policy information from the AMF or the first SW.

Alternatively, if in step 3, the second SW obtains the splitting policy information from the PCF, and in step 4, the third SW generates the splitting policy, the third SMF further needs to obtain the splitting policy information from the second SW.

Alternatively, if in step 3, the third SMF obtains the splitting policy information from the PCF, and in step 4, the second SW generates the splitting policy, the second SW further needs to obtain the splitting policy information from the third SMF.

The splitting policy generated by the second SW/third SMF includes feature information and routing information of the data flows. The routing information indicates the splitting network element to split the data flows of the applications, for example, route the data flow of the second application to the second UPF, and route the data flow of the first application to the third UPF. A specific form is not limited. For example, the routing information may be a DNAI.

Further, the second SW may select one or more DNAIs from the at least one DNAI in the splitting policy information, and then select the second UPF based on the one or more selected DNAIs. In this case, the at least one DNAI in the splitting policy information may also be referred to as access point information of the application.

Step 5: The second SMF/third SW sends the splitting policy to the splitting network element.

The foregoing steps are merely used as an example implementation. There may be another implementation during actual application. This is not limited in the present disclosure.

It should be noted that an implementation process of sending the splitting policy to the splitting network element may be combined with the embodiment shown in FIG. 3A and FIG. 3B. An implementation detail including, for example, a sequence of the steps, is not limited in this application, and may be flexibly set based on an actual requirement.

FIG. 4 is a schematic diagram, corresponding to Embodiment 1, of data flows of a session. Before the terminal moves, a session established by the terminal is a first session (shown by a dashed line in the figure). A user plane path of the session is: the terminal-a RAN 1-the first UPF. After the terminal moves, the user plane path of the first session is updated to: the terminal-a RAN 2-the first UPF, and the terminal further establishes a second session. SMFs selected by the AMF include the second SMF and the third SW. A UPF selected by the second SW is the second UPF (in the figure, an example in which the second UPF and the first UPF are different UPFs is used, and actually, the second UPF and the first UPF may be a same UPF). A UPF selected by the third SMF is the third UPF, and the second SMF or the third SMF selects a UPF as the splitting network element. According to a splitting policy, the splitting network element may send a data flow of a second application of the second session to the second UPF, and send a data flow of a first application of the second session to the third UPF, such that after moving, the terminal can access the second application using the second UPF. The second application is an application that does not support application relocation. The second UPF corresponds to one or more DNAIs, and the one or more DNAIs correspond to an AF server corresponding to the second application.

In Embodiment 1, for the second SMF and the third SMF that correspond to the second session, in an implementation method, there is an interface between the AMF and the second SMF, there is an interface between the AMF and the third SMF, and there is an interface between the second SMF and the third SMF. Based on this scenario, a session processing method is shown in FIG. 3A and FIG. 3B.

In Embodiment 1, for the second SMF and the third SMF that correspond to the second session, in another implementation, there is an interface between the AMF and the second SMF, there is no interface between the AMF and the third SMF, and there is an interface between the second SMF and the third SMF. Based on this scenario, the first request message in step 305 of the session processing method shown in FIG. 3A and FIG. 3B further includes information about the third SMF, and step 307 needs to be modified as: sending, by the second SMF, a second request message to the third SMF, where the request message requests to establish the second session.

In Embodiment 1, for the second SMF and the third SMF that correspond to the second session, in another implementation, there is no interface between the AMF and the second SMF, there is an interface between the AMF and the third SMF, and there is an interface between the second SMF and the third SMF. Based on this scenario, the second request message in step 307 of the session processing method shown in FIG. 3A and FIG. 3B further includes information about the second SMF, and step 305 needs to be modified as: sending, by the third SMF, a first request message to the second SMF, where the request message requests to establish the second session. In this case, step 306 needs to be performed after the step.

Embodiment 2

In the embodiment shown in FIG. 3A and FIG. 3B, the second SMF selected by the AMF and the first SMF are different SMFs. In another embodiment, a second SMF selected by an AMF and the first SMF may be a same SMF. For example, during implementation, when the first SMF determines that an application data flow in the first session has a requirement of not supporting application relocation, the SMF remains unchanged. Then, the first SMF may not send an SMF reallocation instruction to the AMF. Further, when a new session (namely, a second session) is established, the AMF always uses the first SMF in the first session as an SMF in the second session. To be more specific, the AMF selects the first SMF as the second SMF.

For example, in this embodiment, a session established by a terminal before the terminal moves is referred to as the first session, and an SMF providing a service for the terminal is referred to as the first SMF. A session established by the terminal after the terminal moves is referred to as the second session. SMFs each providing a service for the terminal include a second SMF and a third SMF. A UPF selected by the second SMF is referred to as a second UPF. The second UPF is configured to route a data flow of a second application of the second session. The second application is an application that does not support application relocation. For example, the second application may be the application corresponding to the AF 1 in FIG. 1. A UPF selected by the third SMF is referred to as a third UPF. The third UPF is configured to route a data flow of a first application of the second session. The first application is an application that supports application relocation. For example, the first application may be the application corresponding to the AF 2 or the AF 3 in FIG. 1. Before the terminal moves and after the terminal moves, AMFs each providing a service for the terminal are a same AMF. In addition, the second SMF selected by the AMF in this embodiment and the first SMF are a same SMF.

In this embodiment, the second SMF stores session context information of the first session. The session context information includes access point information of an application, and may further include splitting policy information. Further, the second SMF stores information about a PCF.

Therefore, based on Embodiment 2, Embodiment 2 mainly has the following differences based on Embodiment 1 shown in FIG. 3A and FIG. 3B.

First, in step 303, the AMF selects the first SMF as the second SMF based on the access point information of the application.

Second, in step 305, in a newly added implementation, the first request message may not need to carry the access point information of the application, but may carry an identifier of the first session. Then, the second SMF may obtain the session context information based on the identifier of the first session, and then select the second UPF based on the session context information. For example, the session context information includes the access point information of the application. The access point information of the application that is included in the session context information may be obtained by the first SMF from an NEF or the PCF. The NEF may determine the access point information (including one or more DNAIs) based on location information of an AF that is obtained from the AF. Therefore, the second SMF may select the second UPF based on the access point information that is of the application and that is in the session context information.

FIG. 5 is a schematic diagram, corresponding to Embodiment 2, of data flows of a session. Before a terminal moves, a session established by the terminal is a first session (shown by a dashed line in the figure). A user plane path of the session is: the terminal-a RAN 1-*a* first UPF. After the terminal moves, the user plane path of the first session is updated to: the terminal-a RAN 2-the first UPF, and the terminal further establishes a second session. SMFs selected by an AMF include a second SMF and a third SMF. A UPF selected by the second SMF is a second UPF (in the figure, an example in which the second UPF and the first UPF are a same UPF is used, and actually, the second UPF and the first UPF may be different UPFs). A UPF selected by the third SMF is a third UPF, and the second SMF or the third SMF selects a UPF as a splitting network element. According to a splitting policy, the splitting network element may send a data flow of a second application of the second session to the second UPF, and send a data flow of a first application of the second session to the third UPF, such that after moving, the terminal can access the second application using the second UPF. The second application is an application that does not support application relocation. The second UPF corresponds to one or more DNAIs, and the one or more DNAIs correspond to an AF server corresponding to the second application.

Based on this embodiment, for obtaining, by the splitting network element, the splitting policy information, a main difference from obtaining, by the splitting network element, the splitting policy information in Embodiment 1 shown in FIG. 3A and FIG. 3B lies in that if the second SMF obtains the splitting policy information, the second SMF may directly obtain the splitting policy information locally, without needing to obtain the splitting policy information from the AMF or the PCF. After obtaining the splitting policy information, the second SMF may generate the splitting policy based on the splitting policy information and send the splitting policy to the splitting network element. Alternatively, after obtaining the splitting policy information, the second SMF sends the splitting policy information to the third SMF, and the third SMF generates the splitting policy based on the splitting policy information and sends the splitting policy to the splitting network element.

In Embodiment 2, for the second SMF and the third SMF that correspond to the second session, in an implementation method, there is an interface between the AMF and the second SMF, there is an interface between the AMF and the third SMF, and there is an interface between the second SMF and the third SMF. Based on this scenario, a session processing method is shown in FIG. 3A and FIG. 3B.

In Embodiment 2, for the second SMF and the third SMF that correspond to the second session, in another implementation, there is an interface between the AMF and the second SMF, there is no interface between the AMF and the third SMF, and there is an interface between the second SMF and the third SMF. Based on this scenario, the first request message in step 305 of the session processing method shown in FIG. 3A and FIG. 3B further includes information about the third SMF, and step 307 needs to be modified as: sending, by the second SMF, a second request message to the third SMF, where the request message requests to establish the second session.

In Embodiment 2, for the second SMF and the third SMF that correspond to the second session, in another implementation, there is no interface between the AMF and the second SMF, there is an interface between the AMF and the third SMF, and there is an interface between the second SMF and the third SMF. Based on this scenario, the second request message in step 307 of the session processing method shown in FIG. 3A and FIG. 3B further includes information about the second SMF, and step 305 needs to be modified as: sending, by the third SMF, a first request message to the second SMF, where the request message requests to establish the second session. In this case, step 306 needs to be performed after the step.

Embodiment 3

In the embodiment shown in FIG. 3A and FIG. 3B, the AMF selects two SMFs: the second SMF and the third SMF. If the AMF can select one SMF, and coverage area of the SMF is sufficiently large, the AMF may also need to select only one SMF. Therefore, in another embodiment, an AMF selects an SMF and the SMF is different from the first SMF. For ease of description, the SMF is referred to as a fourth SMF. The fourth SMF has functions of the second SMF and the third SMF.

In this embodiment, a session established by a terminal before the terminal moves is referred to as a first session, and an SMF providing a service for the terminal is referred to as a first SMF. A session established by the terminal after the terminal moves is referred to as a second session. An SMF providing a service for the terminal is the fourth SMF. UPFs selected by the second SMF include a fifth UPF and a sixth UPF. The fifth UPF is configured to route a data flow of a second application of the second session. The second application is an application that does not support application relocation. For example, the second application may be the application corresponding to the AF 1 in FIG. 1. The sixth UPF is configured to route a data flow of a first application of the second session. The first application is an application that supports application relocation. For example, the first application may be the application corresponding to the AF 2 or the AF 3 in FIG. 1. Before the terminal moves and after the terminal moves, AMFs each providing a service for the terminal are a same AMF. In addition, the fourth SMF selected by the AMF in this embodiment and the first SMF are different SMFs.

Figure 6:
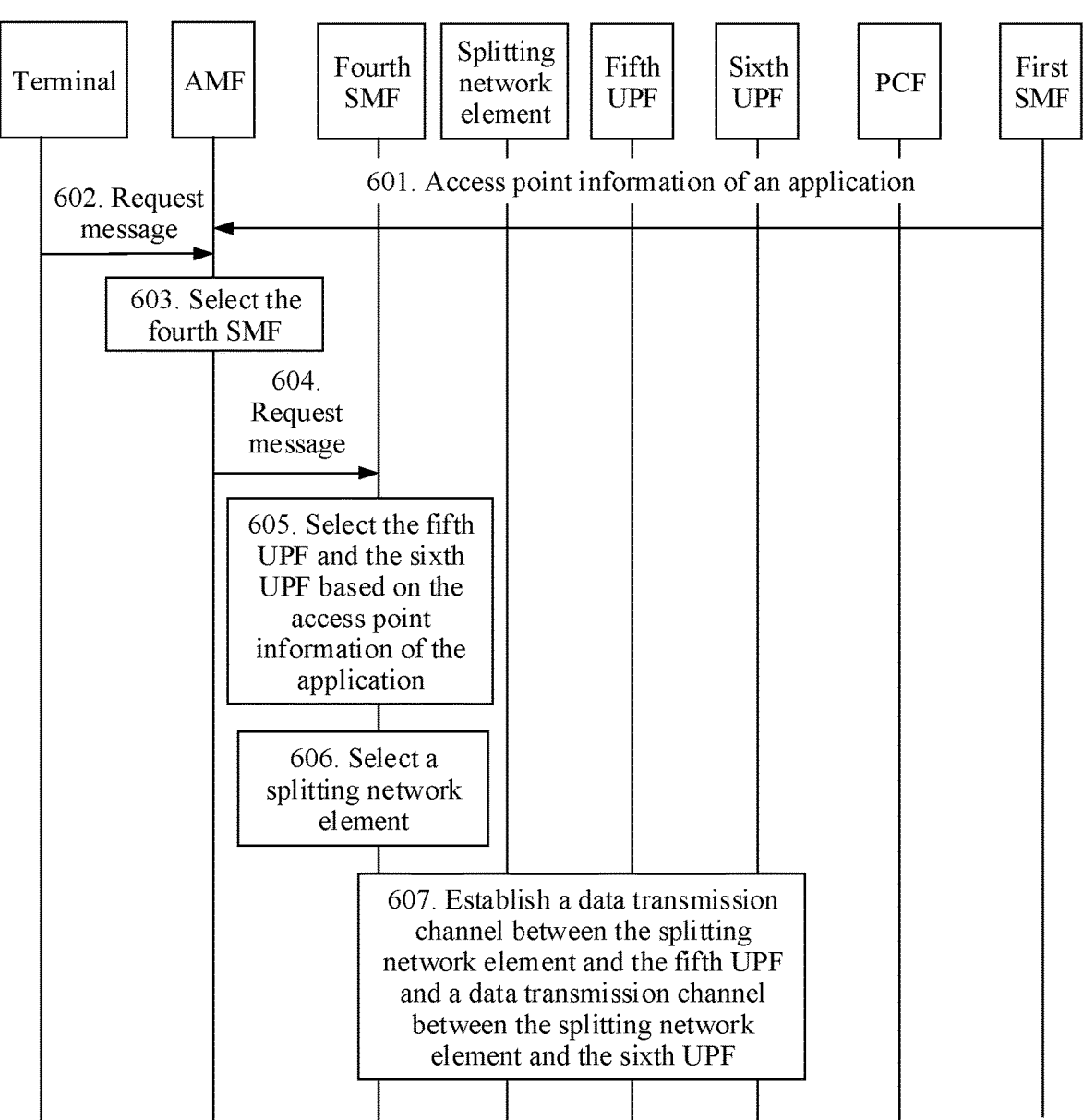
FIG. 6 is a flowchart of another session processing method according to this application.

FIG. 6 is a flowchart of another session processing method according to this application. The method includes the following steps.

Step 601 and step 602 are the same as step 301 and step 302 in the embodiment shown in FIG. 3A and FIG. 3B. Refer to the foregoing descriptions.

Step 603: The AMF selects the fourth SMF.

For example, the AMF may select an SMF based on access point information of an application and/or location information of the terminal. The SMF is referred to as the fourth SMF. In addition, the fourth SMF and the first SMF are different SMFs.

Step 604: The AMF sends a request message to the fourth SMF, where the request message requests to establish a second session. Correspondingly, the fourth SMF may receive the request message.

During implementation, the request message may be, for example, an Nsmf_PDUSession_CreateSMContext Request message.

Optionally, the request message includes the access point information of the application. The access point information of the application is used by the fourth SMF to select a UPF.

Optionally, the request message may further include an identifier of a first session and an identifier of the second session.

Step 605: The fourth SMF selects the fifth UPF and the sixth UPF based on the access point information of the application.

An example implementation process in which the fourth SMF selects the fifth UPF is similar to the method for selecting, by the second SMF, the second UPF in the embodiment shown in FIG. 3A and FIG. 3B. An example implementation process in which the fourth SMF selects the sixth UPF is similar to the method for selecting, by the third SMF, the third UPF in the embodiment shown in FIG. 3A and FIG. 3B. Refer to the foregoing descriptions.

The fifth UPF is configured to route a data flow of a second application of the second session. The second application is an application that does not support application relocation. The sixth UPF is configured to route a data flow of a first application of the second session. The first application is an application that supports application relocation.

Step 606: The fourth SMF selects a splitting network element.

A method for selecting, by the fourth SMF, a splitting network element is not limited in this application. For example, the fourth SMF may select a splitting network element based on a part or all of information such as the location information of the terminal, the identifier of the first session, and the identifier of the second session.

Step 607: The fourth SMF establishes a data transmission channel between the splitting network element and the fifth UPF and a data transmission channel between the splitting network element and the sixth UPF.

Based on this embodiment, the fifth UPF may be selected. The fifth UPF is configured to route the data flow of the second application of the second session. The second application is an application that does not support application relocation. In this way, after moving, the terminal can still access the second application using the fifth UPF and through the second session. The fifth UPF corresponds to one or more DNAIs. The one or more DNAIs correspond to an AF server corresponding to the second application.

Figure 7:
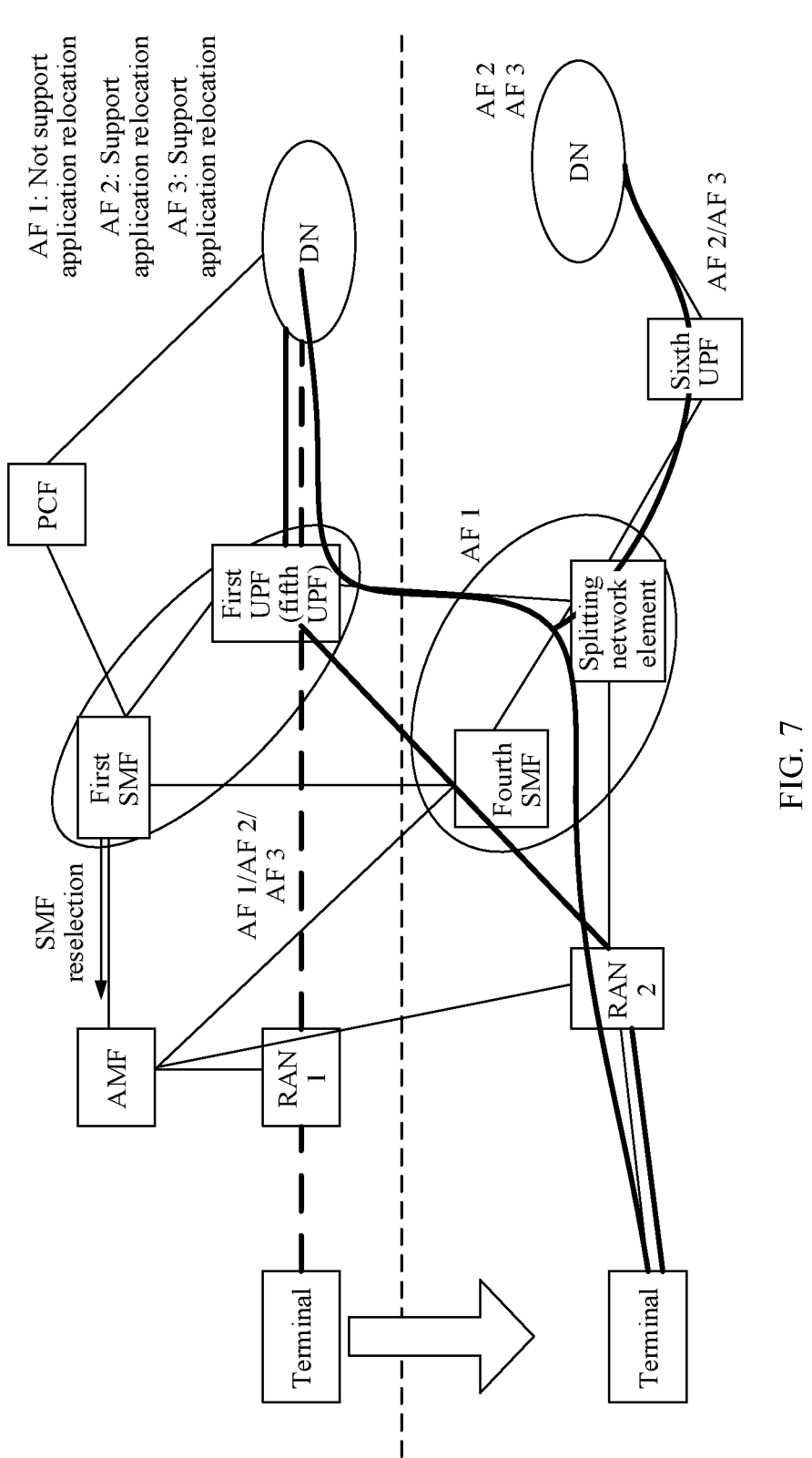
FIG. 7 is another schematic diagram of data flows of a session according to this application.

FIG. 7 is a schematic diagram, corresponding to Embodiment 3, of data flows of a session. Before the terminal moves, a session established by the terminal is a first session (shown by a dashed line in the figure). A user plane path of the session is: the terminal-a RAN 1-*a* first UPF. After the terminal moves, the user plane path of the first session is updated to: the terminal-a RAN 2-the first UPF, and the terminal further establishes a second session. An SMF selected by the AMF is the fourth SMF. In addition, the fourth SMF and the first SMF are different SMFs. UPFs selected by the fourth SMF include the fifth UPF (in the figure, an example in which the fifth UPF and the first UPF are a same UPF is used, and actually, the fifth UPF and the first UPF may alternatively be different UPFs) and a sixth UPF. In addition, the fourth SMF selects a UPF as a splitting network element. According to a splitting policy, the splitting network element may send a data flow of a second application of the second session to the fifth UPF, and send a data flow of a first application of the second session to the sixth UPF, such that after moving, the terminal can still access the second application using the fifth UPF. The second application is an application that does not support application relocation. The fifth UPF corresponds to one or more DNAIs, and the one or more DNAIs correspond to an AF server corresponding to the second application.

Further, when splitting received data flows of applications, the splitting network element needs to split the data flows according to the received splitting policy. The data flows of the applications include applications that support application relocation and/or applications that do not support application relocation. In this embodiment, the fourth SMF obtains splitting policy information, determines the splitting policy based on the splitting policy information, and then sends the splitting policy to the splitting network element. The following describes an implementation method for obtaining, by the fourth SMF, the splitting policy information. It should be noted that any one of the following methods may be implemented with reference to the embodiment shown in FIG. 6, or may be implemented separately, which is not limited.

Implementation method 1: The AMF obtains the splitting policy information and sends the splitting policy information to the fourth SMF.

For example, in the step of the embodiment shown in FIG. 6, when sending the access point information of the application to the first SMF, the AF may further send the splitting policy information to the first SMF. It should be noted that if the access point information and the splitting policy information are each at least one DNAI or an indication of no application relocation possibility, the AF needs to send the at least one DNAI or the indication of no application relocation possibility to the first SMF only once instead of repeatedly.

Alternatively, in another implementation, the AF may separately send the access point information of the application and the splitting policy information to the first SMF.

After receiving the splitting policy information, the first SMF may alternatively store the splitting policy information in session context information of the first session.

Further, the first SMF may send the splitting policy information to the AMF. In an implementation, the first SMF may separately send the splitting policy information to the AMF. In another implementation, the first SMF may alternatively add the splitting policy information to a Namf_Communication_N1N2_MessageTransfer message and send the Namf_Communication_N1N2_MessageTransfer message to the AMF. In this way, the AMF may obtain the splitting policy information. Further, the AMF may locally store the splitting policy information, for example, the AMF may store the splitting policy information in the session context information of the first session.

In an implementation, after step 602 of the embodiment shown in FIG. 6, the AMF determines the session context information based on the identifier of the first session in the received request message. The AMF then determines the splitting policy information based on the session context information, to be more specific, the AMF obtains the stored splitting policy information from the session context information.

After obtaining the splitting policy information, the AMF may send the splitting policy information to the fourth SMF. For example, the AMF may send the splitting policy information to the fourth SMF using a separate message. Alternatively, the AMF includes the splitting policy information in the request message in step 604, and sends the request message to the fourth SMF.

It should be noted that the fourth SMF may directly use the splitting policy information as the splitting policy. To be more specific, the splitting policy is the same as the splitting policy information. Alternatively, the fourth SMF may further add related information to the splitting policy information or modify related information of the splitting policy information to obtain the splitting policy. In this case, the splitting policy and the splitting policy information are not completely the same. For example, the splitting policy is implemented based on an actual requirement. During implementation, the splitting policy may be, for example, a filter.

Embodiment 4

In the embodiment shown in FIG. 6, the fourth SMF selected by the AMF and the first SMF are different SMFs. In another embodiment, a fourth SMF selected by an AMF and the first SMF may alternatively be a same SMF. For example, during implementation, when the first SMF determines that an application data flow in the first session has a requirement of not supporting application relocation, the SMF remains unchanged. Then, the first SMF may not send an SMF reallocation instruction to the AMF. Further, when a new session (namely, a second session) is established, the AMF always uses the first SMF in the first session as an SMF in the second session. To be more specific, the AMF selects the first SMF as the fourth SMF. In this embodiment, because the to-be-selected fourth SMF is the first SMF, the fourth SMF stores session context information of the first session. The session context information includes access point information of an application, and may further include splitting policy information. Further, the fourth SMF further stores information about a PCF.

In this embodiment, a session established by a terminal before the terminal moves is referred to as the first session, and an SMF providing a service for the terminal is referred to as the first SMF. A session established by the terminal after the terminal moves is referred to as the second session. An SMF providing a service for the terminal is the fourth SMF. UPFs selected by the second SMF include a fifth UPF and a sixth UPF. The fifth UPF is configured to route a data flow of a second application of the second session. The second application is an application that does not support application relocation. For example, the second application may be the application corresponding to the AF 1 in FIG. 1. The sixth UPF is configured to route a data flow of a first application of the second session. The first application is an application that supports application relocation. For example, the first application may be the application corresponding to the AF 2 or the AF 3 in FIG. 1. Before the terminal moves and after the terminal moves, AMFs each providing a service for the terminal are a same AMF. In addition, the fourth SMF selected by the AMF in this embodiment and the first SMF are a same SMF.

Therefore, based on this embodiment, this embodiment mainly has the following differences based on the embodiment shown in FIG. 6.

First, in step 603, the AMF selects the first SMF as the fourth SMF.

For example, if splitting policy information received by the first SMF from the PCF includes an application that does not support application relocation, the first SMF may not send an SMF reallocation instruction to the AMF. In other words, if splitting policy information received by the first SMF from the PCF includes no application that does not support application relocation, the first SMF may send an SMF reallocation instruction to the AMF. Therefore, the AMF does not reselect the first SMF. To be more specific, the AMF still selects the first SMF. The first SMF may also be referred to as the fourth SMF. Alternatively, it is understood as that the first SMF is selected as the fourth SMF.

Second, in step 604, in a newly added implementation, the request message may not need to carry the access point information of the application, but may carry an identifier of the first session. Then, the fourth SMF may obtain the session context information based on the identifier of the first session, and then select the fifth UPF and the sixth UPF based on the session context information. For example, the session context information includes the access point information of the application. The access point information of the application that is included in the session context information may be from an AF to the first SMF (namely, the fourth SMF). Therefore, the fourth SMF may select the fifth UPF and the sixth UPF based on the access point information that is of the application and that is in the session context information.

Figure 8:
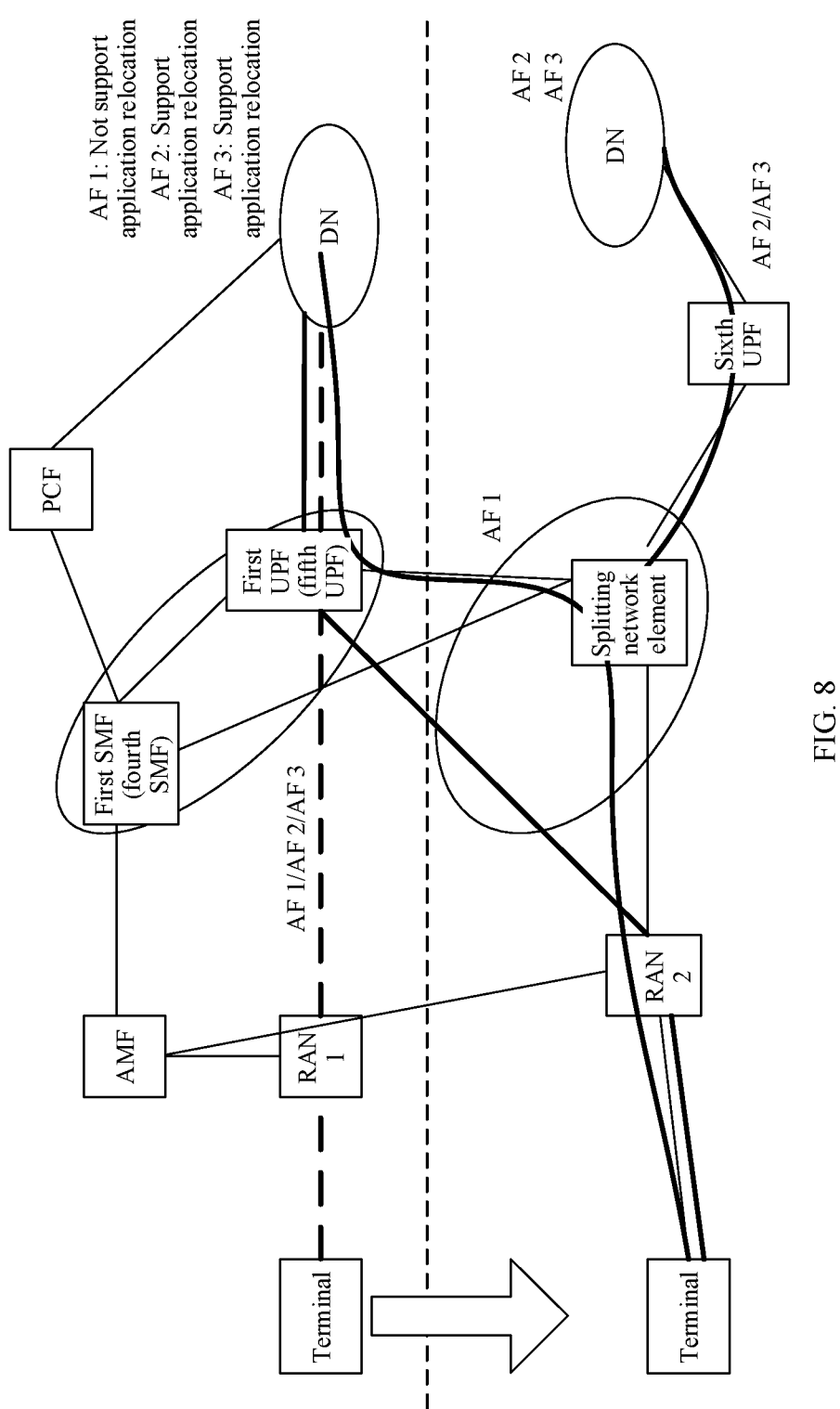
FIG. 8 is another schematic diagram of data flows of a session according to this application.

FIG. 8 is a schematic diagram, corresponding to Embodiment 4, of data flows of a session. Before the terminal moves, a session established by the terminal is a first session (shown by a dashed line in the figure). A user plane path of the session is: the terminal-a RAN 1-*a* first UPF. After the terminal moves, the user plane path of the first session is updated to: the terminal-a RAN 2-the first UPF, and the terminal further establishes a second session. An SMF selected by the AMF is the fourth SMF (where the fourth SMF and the first SMF are a same SMF). UPFs selected by the fourth SMF include the fifth UPF (in the figure, an example in which the fifth UPF and the first UPF are a same UPF is used, and actually, the fifth UPF and the first UPF may alternatively be different UPFs) and the sixth UPF. In addition, the fourth SMF selects a UPF as a splitting network element. According to a splitting policy, the splitting network element may send a data flow of a second application of the second session to the fifth UPF, and send a data flow of a first application of the second session to the sixth UPF, such that after moving, the terminal still accesses the second application. The second application is an application that does not support application relocation.

Based on this embodiment, for obtaining, by the splitting network element, the splitting policy information, a main difference from obtaining, by the splitting network element, the splitting policy information in the embodiment shown in FIG. 6 lies in that the fourth SMF may directly obtain the splitting policy information locally, without needing to obtain the splitting policy information from the AMF or the PCF.

Embodiment 5

Figure 9A:
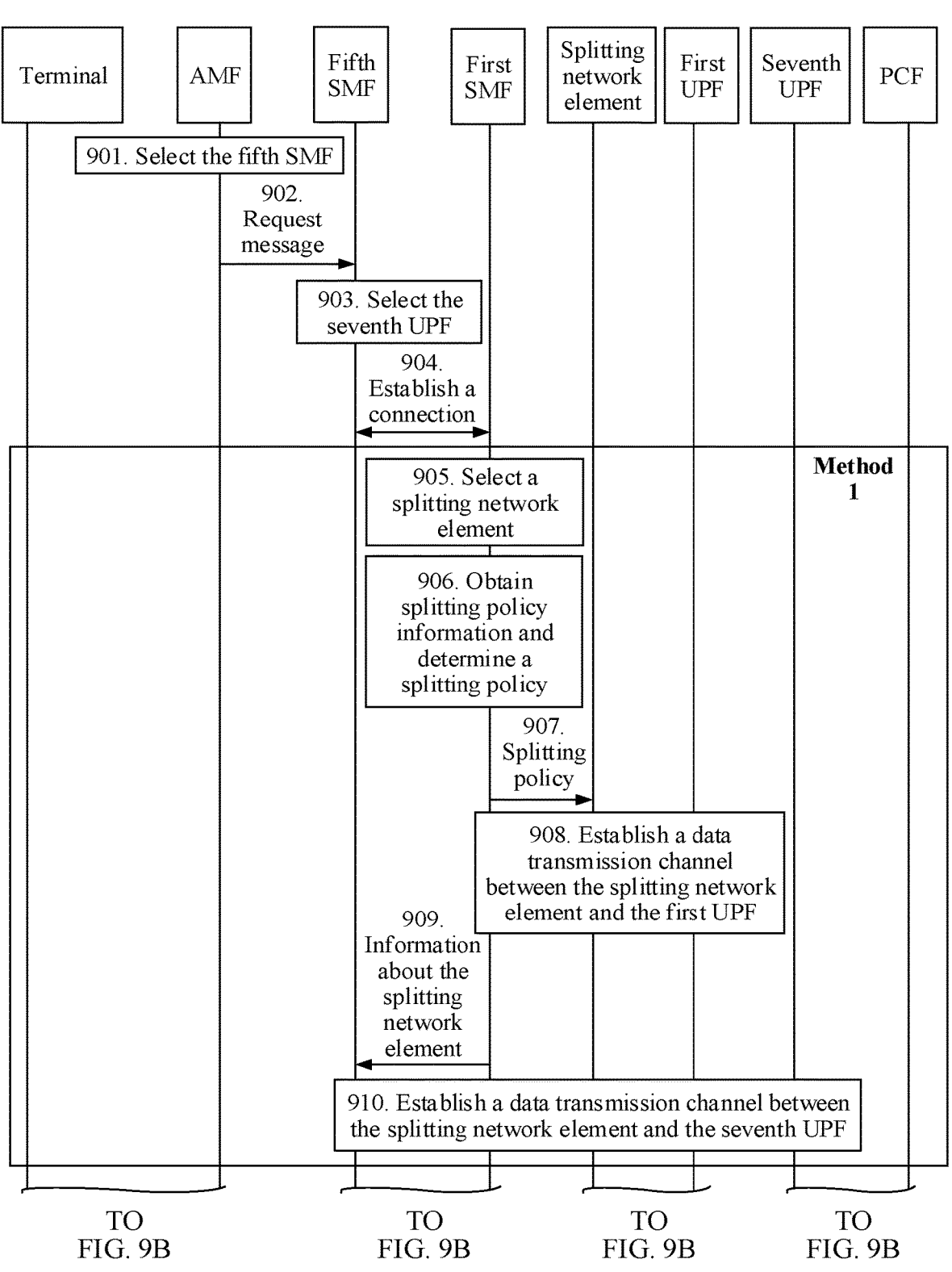
FIG. 9A and FIG. 9B are flowcharts of another session processing method according to this application.
Figure 9B:
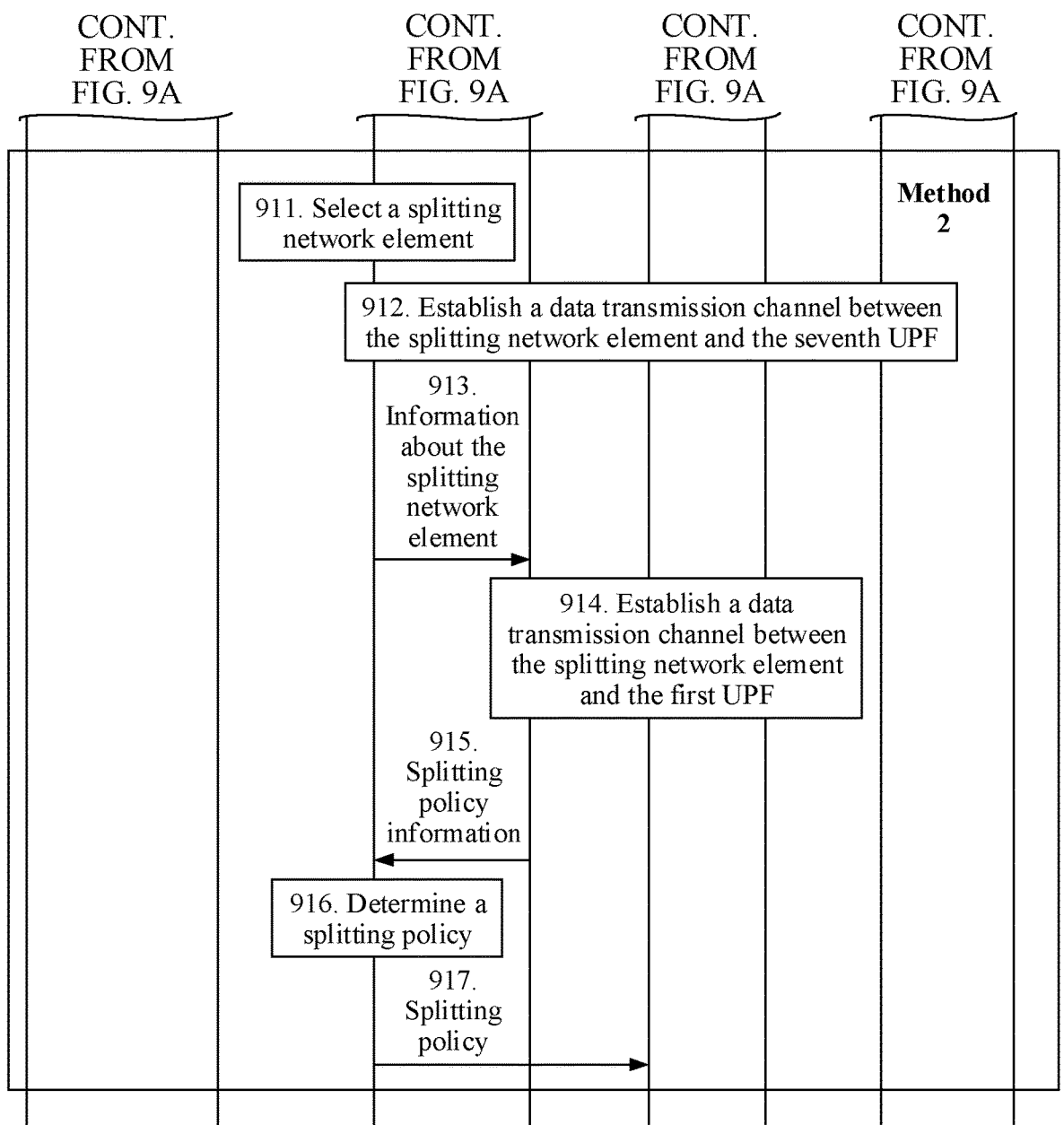

The foregoing embodiments show the session processing methods for the SSC mode 3. The following describes another embodiment. This embodiment shows a session processing method for an SSC mode 1. FIG. 9A and FIG. 9B show another session processing method according to this application.

In this embodiment, before a terminal moves, an SMF that provides a service for the terminal is referred to as a first SMF, and a UPF that provides a service for the terminal is referred to as a first UPF. After the terminal moves, SMFs that each provide a service for the terminal include a first SMF and a fifth SMF. A UPF selected by the fifth SMF is referred to as a seventh UPF. The seventh UPF is configured to route a data flow of a first application of a session. The first application is an application that supports application relocation. For example, the first application may be the application corresponding to the AF 2 or the AF 3 in FIG. 1.

The first UPF is configured to route a data flow of a second application of the session. The second application is an application that does not support application relocation. For example, the second application may be the application corresponding to the AF 1 in FIG. 1. Before the terminal moves and after the terminal moves, AMFs each providing a service for the terminal are a same AMF. In addition, the fifth SMF selected by the AMF in this embodiment and the first SMF are different SMFs. Certainly, the fifth SMF and the first SMF may alternatively be a same SMF.

The method includes the following steps.

Step 901: The AMF selects the fifth SMF.

For example, the AMF may select the fifth SMF based on location information of the terminal and/or information about the first SMF. The fifth SMF may be configured to select the seventh UPF. The seventh UPF is configured to route a data flow of a first application of a second session. The first application is an application that supports application relocation. For example, the first application may be the application corresponding to the AF 2 or the AF 3 in FIG. 1.

Step 902: The AMF sends a request message to the fifth SMF. Correspondingly, the fifth SMF may receive the request message.

The request message includes the information about the first SMF. The information about the first SMF is used by the fifth SMF to establish a connection to the first SMF.

Step 903: The fifth SMF selects the seventh UPF.

For example, the fifth SMF may select a UPF according to a UPF selection principle, for example, based on information such as the location information of the terminal, load information of the UPF, and a DNN, and the selected UPF is the seventh UPF.

Step 904: The fifth SMF establishes the connection to the first SMF based on the information about the first SMF, where the connection may be used to transmit splitting information of data flows of applications of the session.

The splitting information may be, for example, information about a splitting network element, or may be splitting policy information or identification information of a PCF.

The information about the first SMF may be, for example, information such as an identifier of the first SMF.

In an implementation, the fifth SMF may send an Nx message to the first SMF based on the information about the first SMF, and the Nx message requests to establish a signaling connection to the first SMF.

Further, a splitting network element further needs to be selected. The splitting network element is configured to split the data flows of the applications of the session. For example, the data flow of the first application of the session is sent to the seventh UPF, and the data flow of the second application of the session is sent to the first UPF.

In an implementation, the splitting network element may be a UL CL. The UL CL may be a UPF. The splitting network element splits service data flows. For uplink data flows, when the uplink data flows reach the splitting network element, the splitting network element matches a splitting policy with the uplink data flows, and sends the uplink data flows to the first UPF or the seventh UPF. For downlink data flows, the splitting network element merges the uplink data flows and sends the uplink data flows to the terminal. In such a processing manner, there may be a plurality of data flow routing points in one PDU session.

The following describes two methods for selecting a splitting network element.

Method 1: That the first SMF selects a splitting network element includes the following step 905 to step 910.

Step 905: The first SMF selects a splitting network element.

A method for selecting, by the first SMF, a splitting network element is not limited in this application. For example, the first SMF may select a splitting network element based on a part or all of information such as the location information of the terminal and an identifier of the session.

Step 906: The first SMF obtains the splitting policy information and determines the splitting policy based on the splitting policy information.

Herein, the first SMF may obtain the splitting policy information from local session context information. The first SMF may directly use the splitting policy information as the splitting policy. To be more specific, the splitting policy is the same as the splitting policy information. Alternatively, the first SMF may further add related information to the splitting policy information or modify related information of the splitting policy information to obtain the splitting policy. In this case, the splitting policy and the splitting policy information are not completely the same. For example, implementation is based on an actual requirement. During implementation, the splitting policy may be, for example, a filter.

Step 907: The first SMF sends the splitting policy to the splitting network element. Correspondingly, the splitting network element may receive the splitting policy.

Step 908: The first SMF establishes a data transmission channel between the splitting network element and the first UPF.

Step 909: The first SMF sends information about the splitting network element to the fifth SMF. Correspondingly, the fifth SMF may receive the information about the splitting network element.

For example, the first SMF may send identification information of the splitting network element and the like to the fifth SMF. For example, the first SMF may send the information about the splitting network element to the fifth SMF through the connection established in step 904.

Step 910: The fifth SMF establishes a data transmission channel between the splitting network element and the seventh UPF.

Method 2: That the fifth SMF selects a splitting network element includes the following step 911 to step 917.

Step 911: The fifth SMF selects a splitting network element.

A method for selecting, by the fifth SMF, a splitting network element is not limited in this application. For example, the fifth SMF may select a splitting network element based on a part or all of information such as the location information of the terminal and an identifier of the session.

Step 912: The fifth SMF establishes a data transmission channel between the splitting network element and the seventh UPF.

Step 913: The fifth SMF sends information about the splitting network element to the first SMF. Correspondingly, the first SMF may receive the information about the splitting network element.

For example, the fifth SMF may send identification information of the splitting network element and the like to the first SMF. For example, the fifth SMF may send the information about the splitting network element to the first SMF through the connection established in step 904.

Step 914: The first SMF establishes a data transmission channel between the splitting network element and the first UPF.

Step 915: The first SMF sends the splitting policy information to the fifth SMF. Correspondingly, the fifth SMF may receive the splitting policy information.

Step 915 is an optional step. If step 915 is not performed, the fifth SMF may obtain the splitting policy information from the PCF based on the identification information of the PCF. The PCF is a PCF corresponding to the first SMF. The identification information of the PCF may be from the first SMF to the fifth SMF through the connection established in step 904.

Step 916: The fifth SMF determines the splitting policy based on the splitting policy information.

A method for determining, by the fifth SMF, the splitting policy is the same as the method for determining, by the first SMF, the splitting policy in step 906. Refer to the foregoing descriptions.

Step 917: The fifth SMF sends the splitting policy to the splitting network element. Correspondingly, the splitting network element may receive the splitting policy.

It should be noted that in the foregoing steps, there is no strict performing sequence between steps having no time sequence dependency relationship between each other. For example, step 904 may be performed after step 902 and before step 909 or step 913. If step 905 to step 910 are performed, step 906 may be performed after step 905, and step 909 may be performed after step 905 and before step 910. If step 911 to step 917 are performed, step 912 may be performed after step 911, and step 913 and step 914 may be performed after step 911. Performing manners of other steps that have no time sequence limitation may be adjusted based on an actual case. Examples are not used one by one again for description.

According to the foregoing embodiment, the data flow of the second application of the session may be routed using the first UPF, and the second application is an application that does not support application relocation. In this way, after moving, the terminal can still access the second application using the first UPF and through the session. The first UPF corresponds to one or more DNAIs. The one or more DNAIs correspond to an AF server corresponding to the second application.

Figure 10:
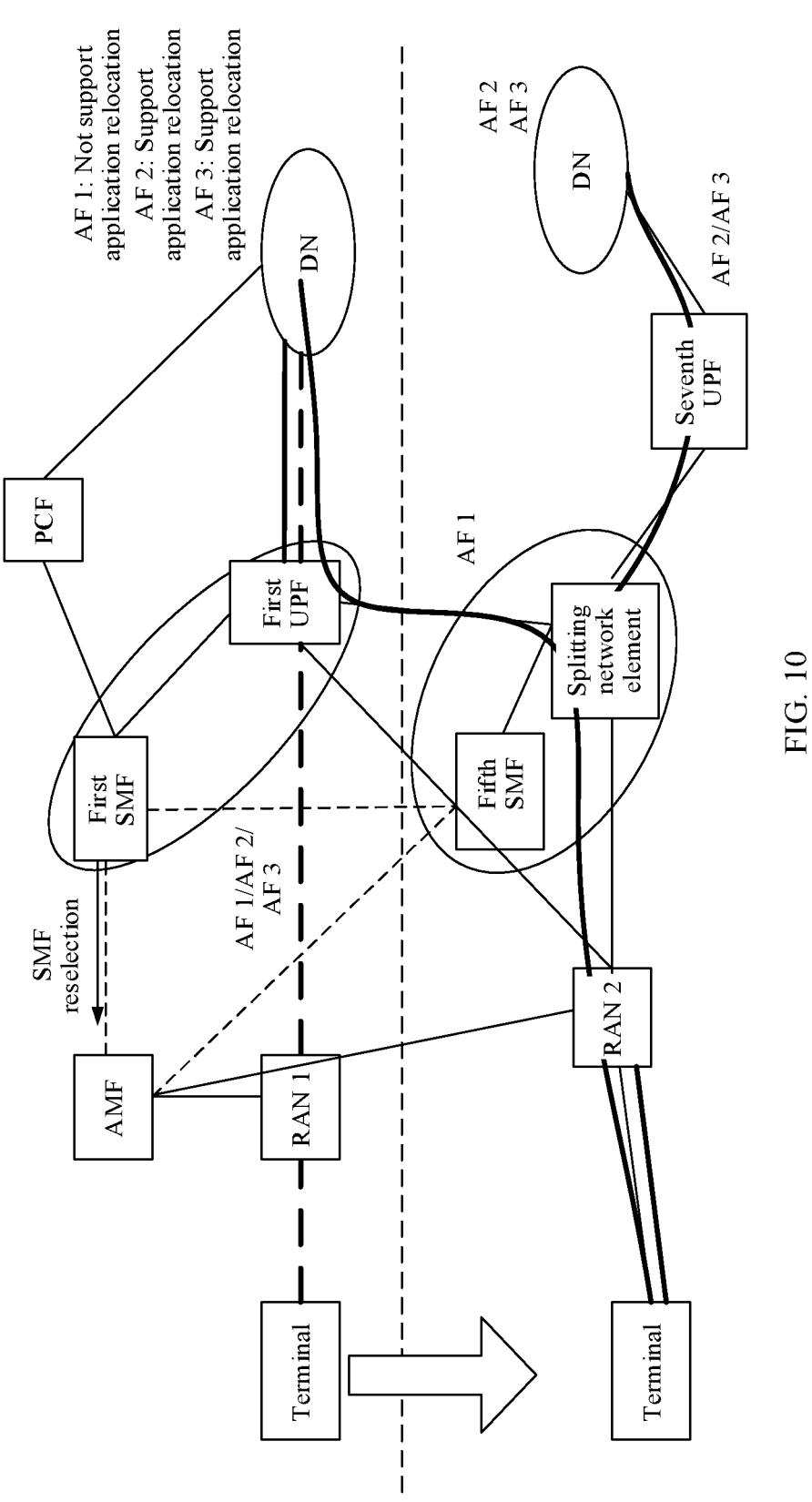
FIG. 10 is a schematic diagram of data flows of a session according to this application.

FIG. 10 is a schematic diagram, corresponding to Embodiment 5, of data flows of a session. Before and after movement of the terminal, a new session is not established for the terminal. Before the terminal moves, a user plane path of the session is: the terminal-a RAN 1-the first UPF. After the terminal moves, the splitting network element and the seventh UPF (selected by the fifth SMF) are inserted into a network, and further the splitting network element splits data flows of applications of the session. Then, the user plane path of the session is updated to: the terminal-a RAN 2-the splitting network element-the first UPF, and the terminal-the RAN 2-the splitting network element-the seventh UPF. According to a splitting policy, the splitting network element may send a data flow of a second application of the session to the first UPF, and send a data flow of a first application of the session to the seventh UPF, such that the terminal can still access the second application using the first UPF after moving. The second application is an application that does not support application relocation. The first UPF corresponds to one or more DNAIs. The one or more DNAIs correspond to an AF server corresponding to the second application.

Embodiment 6

In Embodiment 6, after a first SMF receives access point information of an application, if the first SMF determines, based on the access point information of the application, that an application that does not support application relocation exists in a current session (namely, a first session), the first SMF does not send an SMF reselection instruction to an AMF. Alternatively, it may be understood that after a first SMF receives access point information of an application, if the first SMF determines, based on the access point information of the application, that no application that does not support application relocation exists in a current session (that is, a first session), the first SMF may send an SMF reselection instruction to an AMF, for example, when a location of UE is not within a coverage area of a UPF managed by the first SMF.

In this embodiment, a session established by a terminal before the terminal moves is referred to as the first session, and an SMF providing a service for the terminal is referred to as the first SMF. A session established by the terminal after the terminal moves is referred to as a second session. SMFs that each provide a service for the terminal are the first SMF and a sixth SMF. A UPF selected by the sixth SMF is referred to as an eighth UPF. The eighth UPF is configured to route a data flow of a first application of the second session. The first application is an application that supports application relocation. For example, the first application may be the application corresponding to the AF 2 or the AF 3 in FIG. 1. The first UPF is configured to route a data flow of a second application of the second session. The second application is an application that does not support application relocation. For example, the second application may be the application corresponding to the AF 1 in FIG. 1. Before the terminal moves and after the terminal moves, AMFs each providing a service for the terminal are the same AMF. In addition, the sixth SMF selected by the AMF in this embodiment and the first SMF are different SMFs.

The first session and the second session correspond to a same data network DN.

Figure 11:
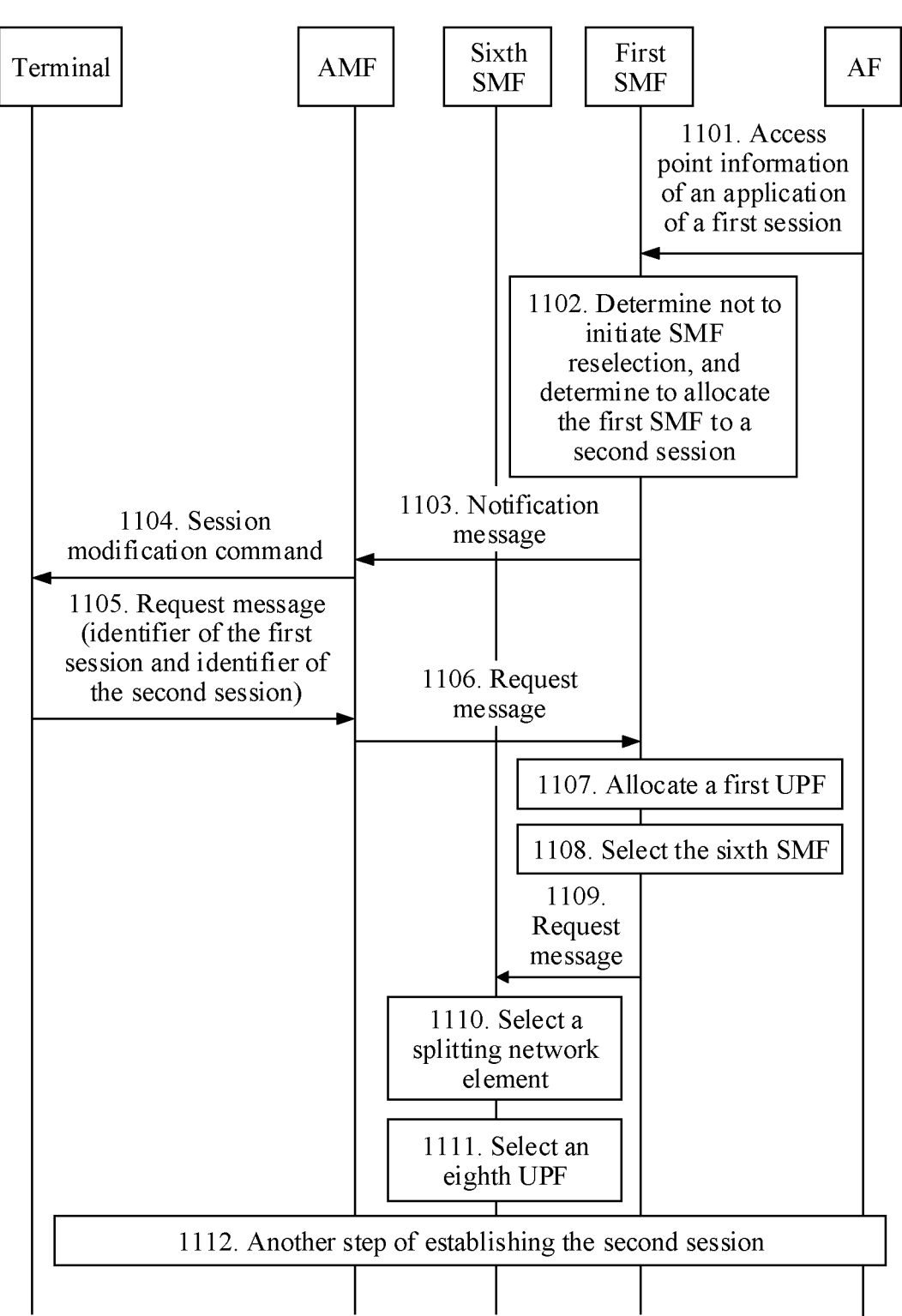
FIG. 11 is a flowchart of another session processing method according to this application.

FIG. 11 is a flowchart of another session processing method according to this application. The method includes the following steps.

Step 1101: An AF sends access point information of an application of a first session to the first SMF. Correspondingly, the first SMF may receive the access point information of the application of the first session.

The access point information of the application is the same as the access point information of the application in the foregoing step 301. Refer to the foregoing descriptions.

Step 1102: The first SMF determines, based on the access point information of the application of the first session, not to initiate SMF reselection, and determines to allocate the first SMF to a second session.

After receiving the access point information of the application of the first session, the first SMF determines that the application does not support application relocation, and determines not to initiate SMF reselection. To be more specific, the first SMF does not send, to an AMF, information used to instruct to reselect an SMF. In such a processing manner, it may be considered that the first SMF determines to allocate the first SMF to the second session.

It should be noted that the first SMF determining not to initiate SMF reselection based on the access point information of the application of the first session may include: If the access point information of the application that is received by the first SMF includes an application that does not support application relocation, even if a location of a UE is out of a location area of a UPF currently managed by the first SMF, the first SMF also determines not to initiate SMF reselection; and/or, if the access point information of the application that is received by the first SMF does not include an application that does not support application relocation, the first SMF may send, to the AMF, the information for instructing to reselect an SMF network element, for example, when a location of a UE is out of a location area of a UPF currently managed by the first SMF.

Step 1103: The first SMF sends a notification message to the AMF. Correspondingly, the AMF may receive the notification message.

The notification message may be, for example, a Namf_Communication_N1N2_MessageTransfer message.

The notification message includes an identifier of the first session (where the identifier of the first session may be, for example, an identifier of a PDU session), an N1 session management container (an N1 SM container), and the like. The N1 SM container is information sent to the terminal, includes a session modification command (for example, a PDU Session Modification Command), and may further include a cause value. The cause value is used to be sent to the terminal, and instruct the terminal to reestablish a session for a same DN, to be more specific, establish the second session.

Step 1104: The AMF sends the session modification command to the terminal. Correspondingly, the terminal may receive the session modification command.

The session modification command is, for example, the PDU Session Modification Command.

Step 1105: The terminal sends a request message to the AMF. Correspondingly, the AMF may receive the request message. The request message includes the identifier of the first session and an identifier of the second session. The request message requests to establish a session.

The terminal initiates session reestablishment based on the session modification command. Therefore, the terminal sends the request message to the AMF, to request to establish a session. Herein, the new session that is requested to be established is the second session.

The terminal initiates a session establishment process, and sends a request message that includes the identifier of the first session and the identifier of the second session. For example, when the session is a PDU session, the identifier of the first session may be further referred to as an old PDU session identifier (old PDU session ID), and the identifier of the second session may be further referred to as a new PDU session ID. After receiving the identifier of the first session and the identifier of the second session, the AMF may determine that the second session is a PDU session reestablished based on the first session.

During implementation, the request message may be a session establishment request message (e.g., a PDU session Establishment request).

Step 1106: The AMF sends a request message to the first SMF. Correspondingly, the first SMF may receive the request message.

The request message may be, for example, an Nsmf_PDU session CreateSMcontext Request message.

The request message requests to establish the second session.

Step 1107: The first SMF allocates a first UPF to the second session.

The first UPF is configured to transmit, in the second session, a data flow corresponding to a second application.

Step 1108: The first SMF selects a sixth SMF.

For example, the first SMF determines context information of the terminal based on identification information of the first session, and selects the sixth SMF for the terminal. The context information of the terminal includes the access point information that is of the application of the first session and that is received in step 1101, and the application does not support application relocation. Therefore, it may also be understood that the first SMF selects the sixth SMF for the terminal based on the access point information of the application and other information.

A sequence of the foregoing step 1107 and step 1108 is not limited.

Step 1109: The first SMF sends a request message to the sixth SMF. Correspondingly, the sixth SMF may receive the request message.

The request message may be, for example, an Nxy message.

In an implementation, the request message indicates selecting a splitting network element. The splitting network element is configured to split data flows of applications of the second session.

In another implementation, the request message includes indication information. The indication information indicates selecting a splitting network element. The splitting network element is configured to split data flows of applications of the second session.

Optionally, the request message includes splitting policy information. The splitting policy information is used by the sixth SMF to select a UPF. The selected UPF is configured to transmit, in the second session, a data flow corresponding to an application supporting a DNAI change. To be more specific, the selected UPF is configured to transmit a data flow corresponding to a first application.

Step 1110: The sixth SMF selects a splitting network element based on the request message.

For an implementation method for selecting a splitting network element, refer to related descriptions in the embodiment shown in FIG. 3A and FIG. 3B.

Step 1111: The sixth SMF selects the eighth UPF.

A sequence of the foregoing step 1110 and step 1111 is not limited.

Further, the sixth SMF may send information about the eighth UPF to the splitting network element, and send information about the splitting network element to the first SMF. The first SMF may also send information about the first UPF to the splitting network element. Therefore, the splitting network element may determine corresponding data routes (to be more specific, select different gateway devices) for the data flows based on features of the data flows. For example, the data flow of the first application of the second session is sent to the eighth UPF, and the data flow of the second application of the second session is sent to the first UPF. The first application is an application that supports application relocation. For example, the first application may be the application corresponding to the AF 2 or the AF 3 in FIG. 1. The second application is an application that does not support application relocation. For example, the second application may be the application corresponding to the AF 1 in FIG. 1.

Step 1112: Remaining step of establishing the second session.

For example, step 1112 includes establishing an uplink data transmission channel and a downlink data transmission channel. For details, refer to related descriptions of the PDU session establishment in other approaches. Details are not described herein again.

In an alternative implementation method, after step 1107 and before step 1112, step 1108 to step 1111 are not performed, and are replaced with the following method.

Step A1: The first SMF selects an eighth UPF.

Step B1: The first SMF selects a splitting network element based on splitting policy information.

Step C1: The first SMF sends information about the first UPF and information about the eighth UPF to the splitting network element.

The splitting network element may determine corresponding data routes (to be more specific, select different gateway devices) for the data flows based on features of the data flows. For example, the data flow of the first application of the second session is sent to the eighth UPF, and the data flow of the second application of the second session is sent to the first UPF. The first application is an application that supports application relocation. For example, the first application may be the application corresponding to the AF 2 or the AF 3 in FIG. 1. The second application is an application that does not support application relocation. For example, the second application may be the application corresponding to the AF 1 in FIG. 1.

To be more specific, in the method that replaces step 1108 to step 1111, the first SMF does not need to select a sixth SMF, but selects the first UPF, the eighth UPF, and the splitting network element, to implement splitting based on the splitting network element.

In another alternative implementation method, after step 1105 and before step 1110, step 1106 to step 1109 are not performed, and are replaced with the following method.

Step A2: The AMF selects a sixth SMF.

For example, the AMF may determine, based on location information of the UE, that the UE is not within coverage of the UPF managed by the first SMF, and the AMF may select an SMF. The SMF is referred to as the sixth SMF.

Step B2: The AMF sends a request message to the first SMF. Correspondingly, the first SMF may receive the request message.

The request message may be, for example, an Nsmf_PDU session CreateSMcontext Request message.

The request message requests to establish the second session.

The request message carries identification information of the sixth SMF, such that the sixth SMF and the first SMF establish a PDU session (namely, the second session) for the UE.

Step C2: The first SMF allocates a first UPF to the second session.

The first UPF is configured to transmit, in the second session, a data flow corresponding to a second application.

It should be noted that there is no sequence relationship between step C2, step A2, and step B2.

Step D2: The first SMF sends a request message to the sixth SMF. Correspondingly, the sixth SMF may receive the request message.

The request message requests to establish the second session.

In an implementation, the request message may be further used to instruct to select a splitting network element. The splitting network element is configured to split data flows of applications of the second session. In another implementation, the request message includes indication information. The indication information indicates selecting a splitting network element. The splitting network element is configured to split data flows of applications of the second session. Optionally, the request message includes splitting policy information. The splitting policy information is used by the sixth SMF to select a UPF. The selected UPF is configured to transmit, in the second session, a data flow corresponding to an application supporting a DNAI change. To be more specific, the selected UPF is configured to transmit a data flow corresponding to a first application.

In the implementation based on step A2 to step D2, there is no interface between the AMF and the sixth SMF; there is an interface between the AMF and the first SMF; and there is an interface between the sixth SMF and the first SMF.

In another alternative implementation method, after step 1105 and before step 1110, step 1106 to step 1109 are not performed, and are replaced with the following method.

Step A3: The AMF selects a sixth SMF.

For example, the AMF may determine, based on location information of the UE, that the UE is not within coverage of the UPF managed by the first SMF, and the AMF may select an SMF. The SMF is referred to as the sixth SMF.

Step B3: The AMF sends a request message to the sixth SMF. Correspondingly, the sixth SMF may receive the request message.

The request message may be, for example, an Nsmf_PDU session CreateSMcontext Request message.

The request message requests to establish the second session.

The request message carries identification information of the first SMF, such that the sixth SMF and the first SMF establish a PDU session (namely, the second session) for the UE.

Step C3: The first SMF allocates a first UPF to the second session.

The first UPF is configured to transmit, in the second session, a data flow corresponding to a second application.

It should be noted that there is no sequence relationship between step C2, step A2, and step B2.

Step D3: The sixth SMF sends a request message to the first SMF. Correspondingly, the first SMF may receive the request message.

The request message requests to establish the second session.

Step E3: The first SMF sends a response message to the sixth SMF. Correspondingly, the sixth SMF may receive the response message.

In an implementation, the response message indicates selecting a splitting network element. The splitting network element is configured to split data flows of applications of the second session. In another implementation, the response message includes indication information. The indication information indicates selecting a splitting network element. The splitting network element is configured to split data flows of applications of the second session. Optionally, the response message includes splitting policy information. The splitting policy information is used by the sixth SMF to select a UPF. The selected UPF is configured to transmit, in the second session, a data flow corresponding to an application supporting a DNAI change. To be more specific, the selected UPF is configured to transmit a data flow corresponding to a first application.

In the implementation based on step A3 to step E3, there is an interface between the AMF and the sixth SMF; there is no interface between the AMF and the first SMF; and there is an interface between the sixth SMF and the first SMF.

In another alternative implementation method, after step 1105 and before step 1110, step 1106 to step 1109 are not performed, and are replaced with the following method.

Step A4: The AMF selects a sixth SMF.

For example, the AMF may determine, based on location information of the UE, that the UE is not within coverage of the UPF managed by the first SMF, and the AMF may select an SMF. The SMF is referred to as the sixth SMF.

Step B4: The AMF sends a request message to the first SMF. Correspondingly, the first SMF may receive the request message.

The request message may be, for example, an Nsmf_PDU session CreateSMcontext Request message.

The request message requests to establish the second session.

Optionally, the request message carries identification information of the sixth SMF, such that the sixth SMF and the first SMF establish a PDU session (namely, the second session) for the UE.

Step C4: The first SMF allocates a first UPF to the second session.

The first UPF is configured to transmit, in the second session, a data flow corresponding to a second application.

Step D4: The AMF sends a request message to the sixth SMF. Correspondingly, the sixth SMF may receive the request message.

The request message may be, for example, an Nsmf_PDU session CreateSMcontext Request message.

The request message requests to establish the second session.

Optionally, the request message carries identification information of the first SMF, such that the sixth SMF and the first SMF establish a PDU session (namely, the second session) for the UE.

Optionally, if the request message in step B4 carries the identification information of the sixth SMF, the following step E11 may be performed. If the request message in step D4 carries the identification information of the first SMF, the following step E12 and step E13 may be performed. If step E11 is performed, step E12 and step E13 do not need to be performed. Similarly, if step E12 and step E13 are performed, step E11 does not need to be performed.

Step E11: The first SMF sends a request message to the sixth SMF. Correspondingly, the sixth SMF may receive the request message.

The request message indicates selecting a splitting network element. The splitting network element is configured to split data flows of applications of the second session. In another implementation, the request message includes indication information. The indication information indicates selecting a splitting network element. The splitting network element is configured to split data flows of applications of the second session. Optionally, the request message includes splitting policy information. The splitting policy information is used by the sixth SMF to select a UPF. The selected UPF is configured to transmit, in the second session, a data flow corresponding to an application supporting a DNAI change. To be more specific, the selected UPF is configured to transmit a data flow corresponding to a first application.

Step E12: The sixth SMF sends a request message to the first SMF. Correspondingly, the first SMF may receive the request message.

Step E13: The first SMF sends a response message to the sixth SMF. Correspondingly, the sixth SMF may receive the response message.

In an implementation, the response message indicates selecting a splitting network element. The splitting network element is configured to split data flows of applications of the second session. In another implementation, the response message includes indication information. The indication information indicates selecting a splitting network element. The splitting network element is configured to split data flows of applications of the second session. Optionally, the response message includes splitting policy information. The splitting policy information is used by the sixth SMF to select a UPF. The selected UPF is configured to transmit, in the second session, a data flow corresponding to an application supporting a DNAI change. To be more specific, the selected UPF is configured to transmit a data flow corresponding to a first application.

In the implementations based on step A4 to step D4 and step E11, or based on step A4 to step D4, step E12, and step E13, there is an interface between the AMF and the sixth SMF; there is an interface between the AMF and the first SMF; and there is an interface between the sixth SMF and the first SMF.

It should be noted that, if there is no time sequence dependency between the steps in Embodiment 6 of this application, a sequence between the steps may be adjusted.

According to the foregoing embodiment, the data flow of the second application of the second session may be routed using the first UPF, and the second application is an application that does not support application relocation. In this way, after moving, the terminal can still access the second application using the second session.

Figure 12A:
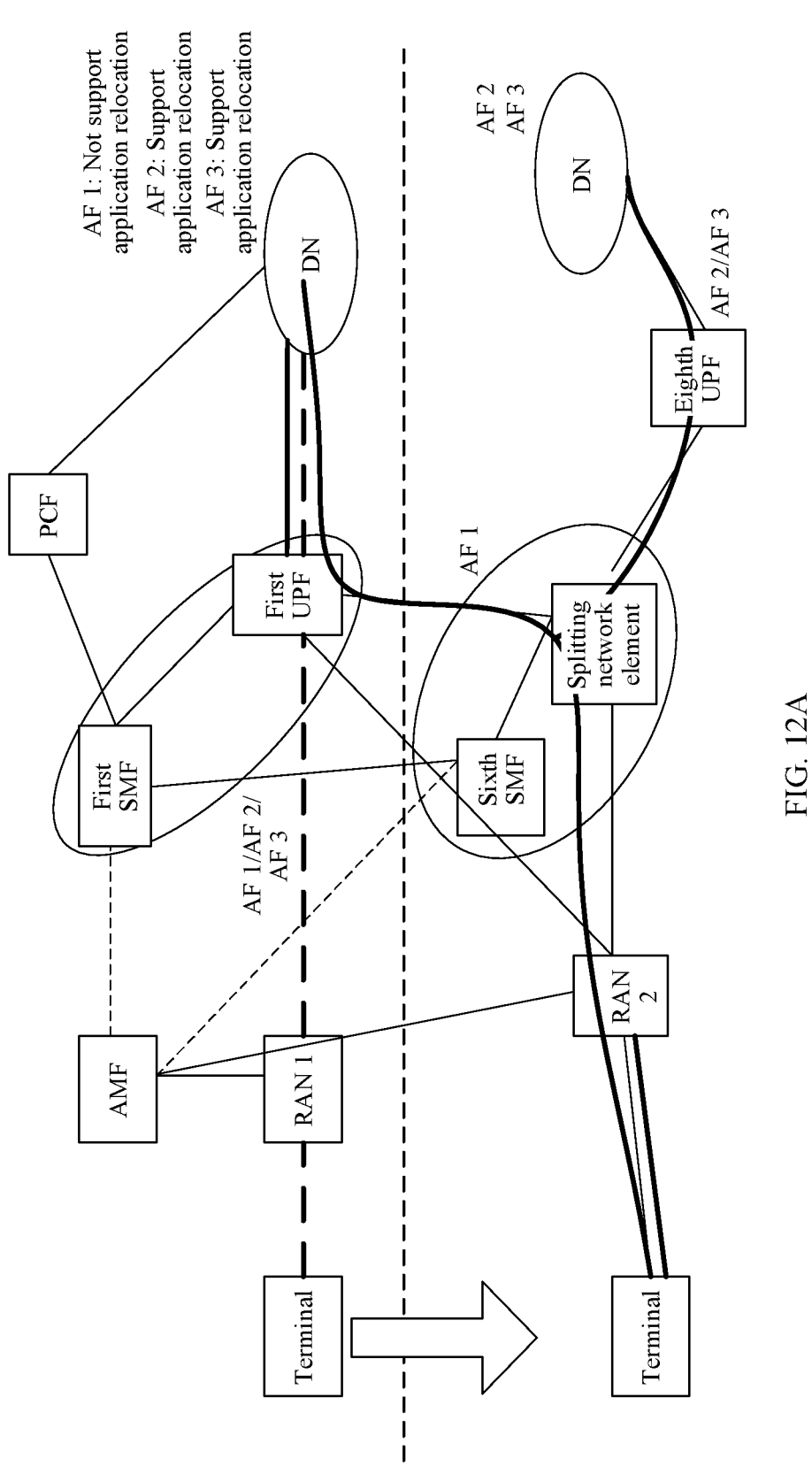
FIG. 12A is a schematic diagram of data flows of a session according to this application.

FIG. 12A is a schematic diagram, corresponding to Embodiment 6, of data flows of a session. Before the terminal moves, a session established by the terminal is a first session (shown by a dashed line in the figure). A user plane path of the session is: the terminal-a RAN 1-the first UPF. After the terminal moves, the user plane path of the first session is updated to: the terminal-a RAN 2-the first UPF, and the terminal further establishes a second session. An SMF selected by the first SMF is the sixth SMF, and the sixth SMF and the first SMF are different SMFs. A UPF selected by the sixth SMF is the eighth UPF, and the sixth SMF selects a UPF as a splitting network element. According to a splitting policy, the splitting network element may send the data flow of the second application of the second session to the first UPF, and send the data flow of the first application of the second session to the eighth UPF, such that the terminal can still access the second application using the first UPF after moving. The second application is an application that does not support application relocation. The first UPF corresponds to one or more DNAIs. The one or more DNAIs correspond to an AF server corresponding to the second application.

In Embodiment 6, for the first SMF and the sixth SMF that correspond to the second session, in an implementation method, there is an interface between the AMF and the first SMF; there is an interface between the AMF and the sixth SMF; and there is an interface between the first SMF and the sixth SMF. Based on this scenario, a session processing method is shown in FIG. 11.

In Embodiment 6, for the first SMF and the sixth SMF that correspond to the second session, in another implementation, there is an interface between the AMF and the first SMF; there is no interface between the AMF and the sixth SMF; and there is an interface between the first SMF and the sixth SMF. Based on this scenario, in the session processing method shown in FIG. 11, if the sixth SMF is selected by the AMF, the AMF does not send, to the sixth SMF, the request message used to request to establish the second session, but sends information about the sixth SMF to the first SMF. Then, the first SMF sends, to the sixth SMF, the request message used to request to establish the second session.

In Embodiment 6, for the first SMF and the sixth SMF that correspond to the second session, in another implementation, there is no interface between the AMF and the first SMF; there is an interface between the AMF and the sixth SMF; and there is an interface between the first SMF and the sixth SMF. Based on this scenario, in the session processing method shown in FIG. 11, if the sixth SMF is selected by the AMF, the AMF sends, to the sixth SMF, the request message used to request to establish the second session, and sends information about the first SMF to the sixth SMF. In addition, the AMF does not send, to the first SMF, the request message used to request to establish the second session. Then, the sixth SMF sends, to the first SMF, the request message used to request to establish the second session.

Figure 12B:
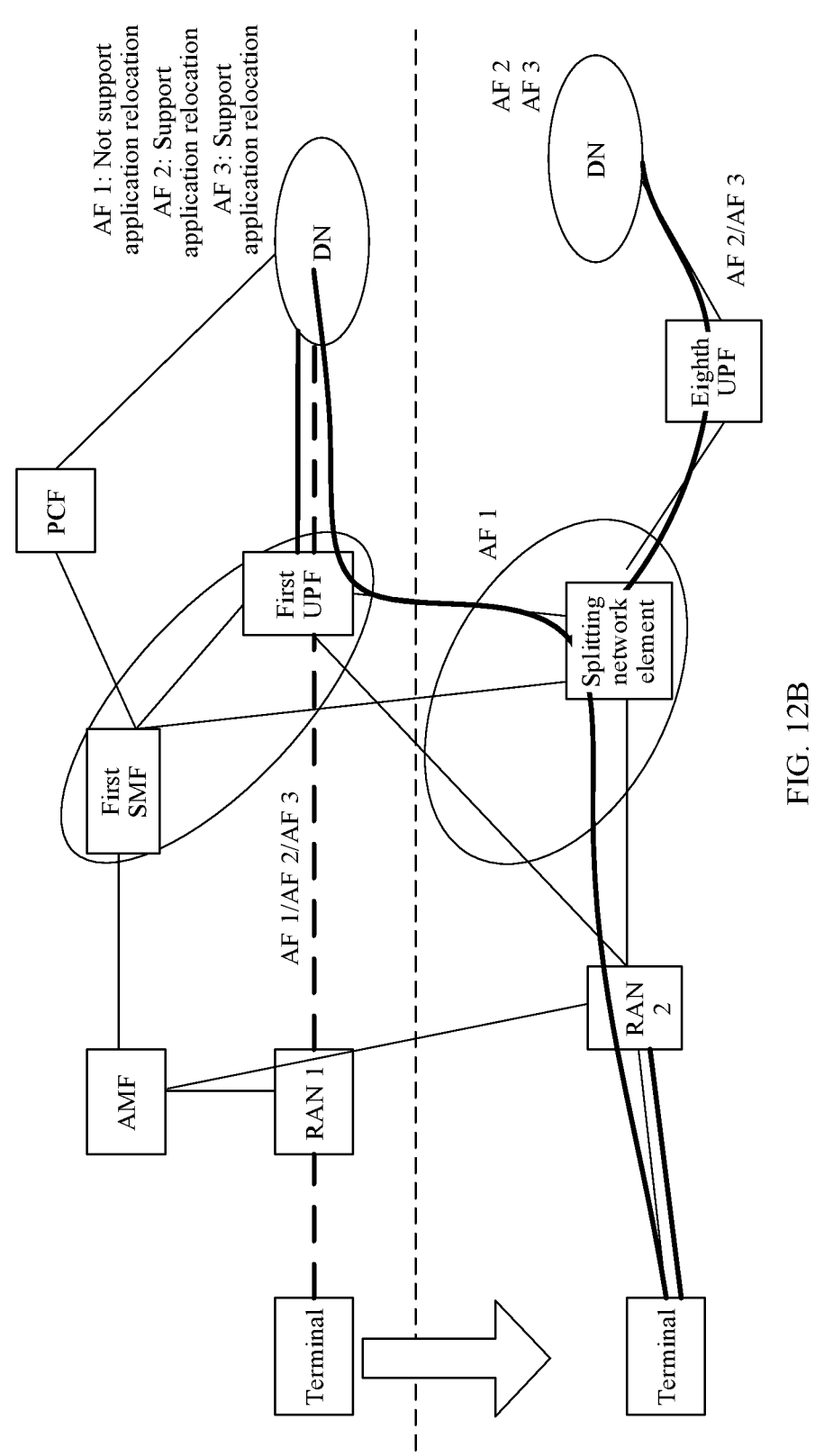
FIG. 12B is another schematic diagram of data flows of a session according to this application.

FIG. 12B is another schematic diagram, corresponding to Embodiment 6, of data flows of a session. Before the terminal moves, a session established by the terminal is a first session (shown by a dashed line in the figure). A user plane path of the session is: the terminal-a RAN 1-the first UPF. After the terminal moves, the user plane path of the first session is updated to: the terminal-a RAN 2-the first UPF, and the terminal further establishes a second session. UPFs selected by the first SMF include the first UPF and the eighth UPF, and the first SMF selects a UPF as a splitting network element. According to a splitting policy, the splitting network element may send the data flow of the second application of the second session to the first UPF, and send the data flow of the first application of the second session to the eighth UPF, such that the terminal can still access the second application using the first UPF after moving. The second application is an application that does not support application relocation. The first UPF corresponds to one or more DNAIs. The one or more DNAIs correspond to an AF server corresponding to the second application.

The solutions provided in this application are described above mainly from a perspective of interaction between network elements. It may be understood that to implement the foregoing functions, each network element includes a corresponding hardware structure and/or software module for performing each function. A person skilled in the art should be aware that, in combination with the examples described in the embodiments disclosed in this specification, units and algorithms steps may be implemented by hardware or a combination of hardware and computer software in the present disclosure. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

Figure 13:
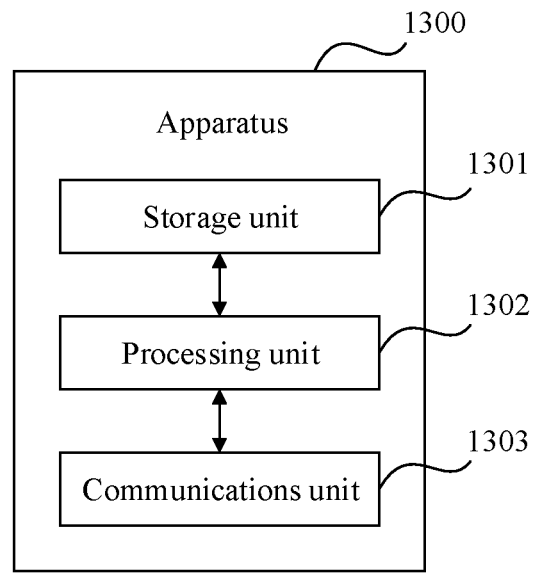
FIG. 13 is a schematic diagram of an apparatus according to this application.

When an integrated unit is used, FIG. 13 is a possible example block diagram of an apparatus according to an embodiment of the present disclosure. The apparatus 1300 may exist in a form of software. The apparatus 1300 may include a processing unit 1302 and a communications unit 1303. In an implementation, the communications unit 1303 may include a receiving unit and a sending unit. The processing unit 1302 is configured to control and manage an action of the apparatus 1300. The communications unit 1303 is configured to support the apparatus 1300 in communicating with another network entity. The apparatus 1300 may further include a storage unit 1301 configured to store program code and data of the apparatus 1300.

The processing unit 1302 may be a processor or a controller, such as a general purpose central processing unit (CPU), a general purpose processor, a digital signal processor (DSP), an application-specific integrated circuit (ASIC), a field-programmable gate array (FPGA) or another programmable logic device, a transistor logic device, a hardware component, or any combination thereof. The processing unit 1302 may implement or execute various example logical blocks, modules, and circuits described with reference to content disclosed in the present disclosure. The processor may alternatively be a combination implementing a computing function, for example, a combination of one or more microprocessors, or a combination of a DSP and a microprocessor. The communications unit 1303 may be a communications interface, a transceiver, a transceiver circuit, or the like. The communications interface is a general term. During implementation, the communications interface may include a plurality of interfaces. The storage unit 1301 may be a memory.

The apparatus 1300 may be the access management network element in any one of the foregoing embodiments, or may be a chip in the access management network element. For example, the processing unit 1302 may support the apparatus 1300 in performing the actions of the access management network element in the foregoing method examples above. For example, the processing unit 1302 is configured to support the apparatus 1300 in performing step 303 and step 304 in FIG. 3A and FIG. 3B, step 603 in FIG. 6, and step 901 in FIG. 9A and FIG. 9B. The communications unit 1303 may support the apparatus 1300 in communicating with a terminal, a fifth session management network element, a fourth session management network element, a third session management network element, a second session management network element, a first session management network element, and a policy control network element. For example, the communications unit 1303 is configured to support the apparatus 1300 in performing step 301, step 302, step 305, and step 307 in FIG. 3A and FIG. 3B, step 601, step 602, and step 604 in FIG. 6, and step 902 in FIG. 9A and FIG. 9B.

In a possible implementation, the communications unit 1303 may include a first communications subunit. The first communications subunit is configured to support the apparatus 1300 in communicating with the fifth session management network element, the fourth session management network element, the third session management network element, the second session management network element, the first session management network element, and the policy control network element. Further, the communications unit 1303 may further include a second communications subunit. The second communications subunit is configured to support the apparatus 1300 in communicating with the terminal.

For example, when the communications unit 1303 includes a sending unit and a receiving unit, in an embodiment, the receiving unit is configured to: receive access point information that is of an application of a first session and that is from the first session management network element; and receive a request message from the terminal, where the request message includes an identifier of the first session and an identifier of a second session. The processing unit is configured to select the second session management network element based on the access point information of the application; and select the third session management network element. Additionally, a sending unit is configured to: send a first request message to the second session management network element, where the first request message requests to establish the second session; and send a second request message to the third session management network element, where the second request message requests to establish the second session.

In a possible implementation, the first request message includes the access point information of the application.

In a possible implementation, the first request message further includes the identifier of the first session and the identifier of the second session.

In a possible implementation, the sending unit is further configured to send information about the second session management network element to the third session management network element.

In a possible implementation, the processing unit is further configured to obtain splitting policy information of applications of the second session. Additionally, the sending unit is further configured to send the splitting policy information to the second session management network element or the third session management network element.

In a possible implementation, the processing unit is further configured to obtain information about a policy control network element corresponding to the first session. Additionally, the sending unit is further configured to send the information about the policy control network element to the second session management network element or the third session management network element.

In a possible implementation, the processing unit is configured to select the first session management network element as the second session management network element based on the access point information of the application.

In another embodiment, the processing unit is configured to obtain splitting policy information of data flows of applications of a second session. Additionally, the sending unit is configured to send the splitting policy information to the second session management network element or the third session management network element that corresponds to the second session.

In a possible implementation, the receiving unit is configured to receive access point information that is of an application of a first session and that is from a first session management network element. The splitting policy information includes the access point information of the application.

In a possible implementation, the receiving unit is configured to receive a session establishment request message from the terminal, where the session establishment request message includes an identifier of a first session. Additionally, the processing unit is configured to: determine session context information based on the identifier of the first session; and determine the splitting policy information based on the session context information.

The apparatus 1300 may be the session management network element in any one of the foregoing embodiments, or may be a chip in the session management network element. The session management network element herein includes a second session management network element, a third session management network element, a fourth session management network element, and a fifth session management network element.

When the apparatus is the second session management network element, for example, the processing unit 1302 may support the apparatus 1300 in performing the actions of the second session management network element in the foregoing method examples, and for example, the processing unit 1302 is configured to support the apparatus 1300 in performing step 306, step 310, step 311, and step 317 in FIG. 3A and FIG. 3B. The communications unit 1303 may support the apparatus 1300 in communicating with the third session management network element, an access management network element, and a policy control network element. For example, the communications unit 1303 is configured to support the apparatus 1300 in performing step 305, step 309, step 312, and step 316 in FIG. 3A and FIG. 3B.

For example, when the communications unit 1303 includes a sending unit and a receiving unit, in an embodiment, the receiving unit is configured to receive a first request message from the access management network element, where the first request message requests to establish a second session. Additionally, the processing unit is configured to select a second user plane network element, where the second user plane network element is configured to route a data flow of a second application of the second session, and the second application is an application that does not support application relocation.

In a possible implementation, the first request message includes an identifier of a first session. The processing unit is configured to: obtain session context information based on the identifier of the first session; and select the second user plane network element based on the session context information.

In a possible implementation, the first request message includes access point information of an application of a first session. Additionally, the processing unit is configured to select the second user plane network element based on the access point information of the application.

In a possible implementation, the processing unit is further configured to select a splitting network element. The splitting network element is configured to split data flows of applications of the second session.

In a possible implementation, the processing unit is further configured to obtain information about a splitting network element from the third session management network element. The splitting network element is configured to split data flows of applications of the second session.

In a possible implementation, the processing unit is further configured to establish a data transmission channel between the splitting network element and the second user plane network element.

In a possible implementation, the processing unit is further configured to obtain splitting policy information and determine a splitting policy based on the splitting policy information. The apparatus further includes a sending unit configured to send the splitting policy to the splitting network element.

In a possible implementation, the processing unit is configured to: obtain the splitting policy information from the policy control network element; or obtain the splitting policy information from the access management network element; or obtain the splitting policy information from the third session management network element.

When the apparatus is the third session management network element, for example, the processing unit 1302 may support the apparatus 1300 in performing the actions of the third session management network element in the foregoing method examples, and for example, the processing unit 1302 is configured to support the apparatus 1300 in performing step 308, step 313, step 314, and step 315 in FIG. 3A and FIG. 3B. The communications unit 1303 may support the apparatus 1300 in communicating with the second session management network element, an access management network element, and a policy control network element. For example, the communications unit 1303 is configured to support the apparatus 1300 in performing step 307, step 309, step 312, and step 316 in FIG. 3A and FIG. 3B.

For example, when the communications unit 1303 includes a sending unit and a receiving unit, in an embodiment, the receiving unit is configured to receive a second request message from the access management network element, where the second request message includes information about the second session management network element, and the second request message requests to establish a second session. Additionally, the processing unit is configured to: select a third user plane network element, where the third user plane network element is configured to route a data flow of a first application of the second session, and the first application is an application that supports application relocation; and establish a connection to the second session management network element based on the information about the second session management network element, where the connection is used to transmit splitting information of data flows of applications of the second session.

In a possible implementation, the processing unit is further configured to select a splitting network element. The splitting network element is configured to split the data flows of the applications of the second session.

In a possible implementation, the processing unit is further configured to obtain information about a splitting network element from the second session management network element. The splitting network element is configured to split the data flows of the applications of the second session.

In a possible implementation, the processing unit is further configured to establish a data transmission channel between the splitting network element and the third user plane network element.

In a possible implementation, the processing unit is further configured to obtain splitting policy information and determine a splitting policy based on the splitting policy information. The sending unit is configured to send the splitting policy to the splitting network element.

In a possible implementation, the processing unit is configured to: obtain the splitting policy information from the policy control network element; or obtain the splitting policy information from the access management network element; or obtain the splitting policy information from the second session management network element.

When the apparatus is the second session management network element or the third session management network element, and the communications unit 1303 includes a sending unit and a receiving unit, in another embodiment, the processing unit is configured to: obtain splitting policy information of data flows of applications of a second session; and determine a splitting policy based on the splitting policy information. Additionally, the sending unit is configured to send the splitting policy to a splitting network element, where the splitting network element is configured to split the data flows of the applications of the second session.

In a possible implementation, the processing unit is configured to: obtain the splitting policy information from an access management network element; or obtain the splitting policy information from a policy control network element; or obtain the splitting policy information from another session management network element.

In a possible implementation, the processing unit is further configured to obtain information about the policy control network element from the other session management network element.

In a possible implementation, the processing unit is further configured to select the splitting network element.

When the apparatus is the fourth session management network element, for example, the processing unit 1302 may support the apparatus 1300 in performing the actions of the fourth session management network element in the method examples above, and for example, the processing unit 1302 is configured to support the apparatus 1300 in performing step 605, step 606, and step 607 in FIG. 6. The communications unit 1303 may support the apparatus 1300 in communicating with an access management network element, a policy control network element, and a user plane network element. For example, the communications unit 1303 is configured to support the apparatus 1300 in performing step 604 in FIG. 6.

When the apparatus is the fifth session management network element, for example, the processing unit 1302 may support the apparatus 1300 in performing the actions of the fifth session management network element in the method examples above, and for example, the processing unit 1302 is configured to support the apparatus 1300 in performing step 903, step 910, step 911, step 912, and step 916 in FIG. 9A and FIG. 9B. The communications unit 1303 may support the apparatus 1300 in communicating with an access management network element, a policy control network element, and a user plane network element. For example, the communications unit 1303 is configured to support the apparatus 1300 in performing step 902, step 904, step 909, step 913, step 915, and step 917 in FIG. 9A and FIG. 9B.

When the apparatus is a first session management network element, for example, the processing unit 1302 may support the apparatus 1300 in performing the actions of the first session management network element in the method examples above, and for example, the processing unit 1302 is configured to support the apparatus 1300 in performing step 1102, step 1107, and step 1108 in FIG. 11. The communications unit 1303 may support the apparatus 1300 in communicating with a sixth session management network element, an access management network element, and an AF. For example, the communications unit 1303 is configured to support the apparatus 1300 in performing step 1101, step 1103, step 1106, and step 1109 in FIG. 11.

For example, when the communications unit 1303 includes a sending unit and a receiving unit, the receiving unit is configured to receive access point information of an application of a first session. The processing unit is configured to determine, based on the access point information of the application, to allocate the first session management network element to a second session, where the first session and the second session correspond to a same data network. Additionally, the receiving unit is further configured to receive a request message, where the request message requests to establish the second session. The first session management network element allocates a first user plane network element to the second session, where the first user plane network element is configured to transmit, in the second session, a data flow corresponding to the application.

In a possible implementation, the application is an application that does not support a DNAI change.

In a possible implementation, the processing unit is configured to allocate a second user plane network element to the second session. The second user plane network element is configured to transmit, in the second session, a data flow corresponding to an application that supports a DNAI change.

In another possible implementation, the sending unit is configured to send splitting policy information to a second session management network element. The splitting policy information is used by the second session management network element to allocate a second user plane network element to the second session. The second user plane network element is configured to transmit, in the second session, a data flow corresponding to an application that supports a DNAI change.

In a possible implementation, the access point information of the application includes at least one of the following information: at least one DNAI, location information of the AF, an indication of no application relocation possibility, or an indication of no DNAI change.

In another possible implementation, a mode type of the first session is an SSC mode 3.

In a possible implementation, a second user plane network element is the eighth UPF in Embodiment 6 of this application, and a second session management network element is the sixth SMF in Embodiment 6 of this application.

In a possible implementation, the processing unit is further configured to release the first session.

The access point information of the application in the apparatus in any one of the foregoing embodiments includes at least one of the following: at least one data network access identifier DNAI, location information of an application function AF, an indication of no application relocation possibility, or an indication of no DNAI change.

The splitting policy information in the apparatus in any one of the foregoing embodiments includes at least one of the following: indication information or information about data flows of applications. The indication information includes at least one of the following: a local processing indication, at least one DNAI, or relocation capability information. The data flows of the applications include data flows of applications that support application relocation and/or data flows of applications that do not support application relocation.

Figure 14:
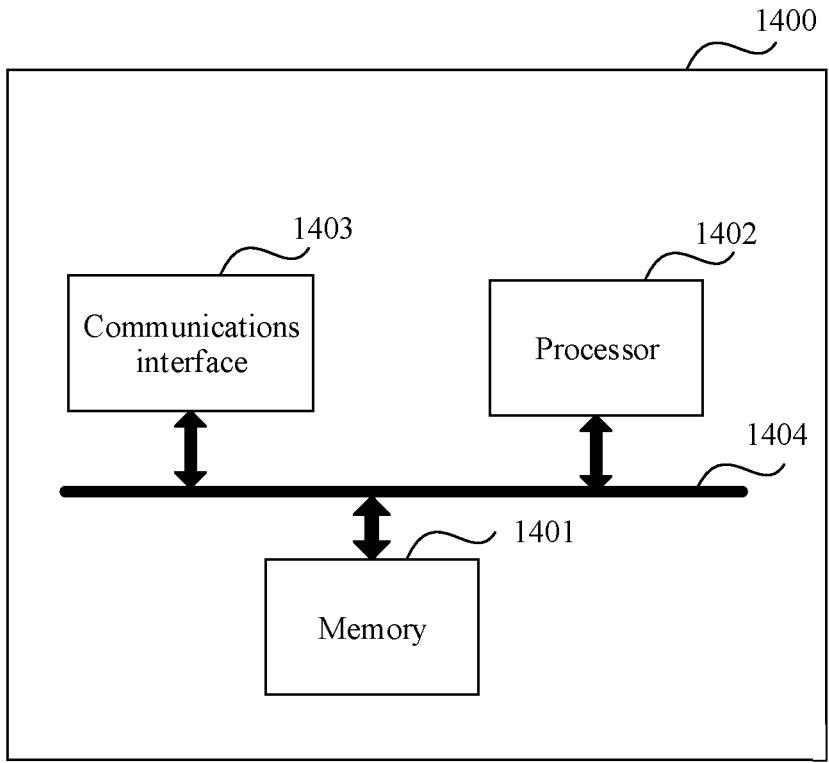
FIG. 14 is a schematic diagram of another apparatus according to this application.

FIG. 14 is a schematic diagram of an apparatus according to this application. The apparatus may be the access management network element or the session management network element (including the second session management network element, the third session management network element, the fourth session management network element, or the fifth session management network element) in the foregoing embodiments. The apparatus 1400 includes a processor 1402, a communications interface 1403, and a memory 1401. Optionally, the apparatus 1400 may further include a bus 1404. The communications interface 1403, the processor 1402, and the memory 1401 may be connected to each other using the line of communication 1404. The line of communication 1404 may be a peripheral component interconnect (PCI) bus, an extended industry standard architecture (EISA) bus, or the like. The line of communication 1404 may be classified into an address bus, a data bus, a control bus, and the like. For ease of representation, only one thick line is used to represent the bus in FIG. 14, but this does not mean that there is only one bus or only one type of bus.

The processor 1402 may be a CPU, a microprocessor, an ASIC, or one or more integrated circuits configured to control program execution in the solutions of this application.

The communications interface 1403, which uses any apparatus such as a transceiver, is configured to communicate with another device or a communications network, such as Ethernet, a RAN, a wireless local area network (WLAN), or a wired access network.

The memory 1401 may be a read-only memory (ROM) or another type of static storage device that can store static information and an instruction, or a random-access memory (RAM) or another type of dynamic storage device that can store information and an instruction, or may be an electrically erasable programmable read-only memory (EE-PROM), a compact disc read-only memory (CD-ROM) or another compact disc storage, an optical disc storage (including a compact optical disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer, but is not limited thereto. The memory may exist independently, and is connected to the processor using the line of communication 1404. The memory may alternatively be integrated with the processor.

The memory 1401 is configured to store a computer-executable instruction for performing the solutions of this application, and execution of the computer-executable instruction is controlled by the processor 1402. The processor 1402 is configured to execute the computer-executable instruction stored in the memory 1401, to implement the session processing method provided in the foregoing embodiments of this application.

Optionally, the computer-executable instruction in this embodiment of this application may also be referred to as application program code. This is not specifically limited in this embodiment of the application.

All or some of the foregoing embodiments may be implemented using software, hardware, firmware, or any combination thereof. When software is used to implement the embodiments, the embodiments may be implemented completely or partially in a form of a computer program product. The computer program product includes one or more computer instructions. When the computer program instruction is loaded and executed on the computer, the procedures or functions according to the embodiments of this application are all or partially generated. The computer may be a general-purpose computer, a dedicated computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The various illustrative logical units and circuits described in the embodiments of the present disclosure may implement or operate the described functions using a general purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general purpose processor may be a microprocessor. Optionally, the general purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an erasable programmable read-only memory (EPROM) memory, an EEPROM memory, a register, a hard disk, a removable magnetic disk, a CD-ROM, or a storage medium in any other form in the art. For example, the storage medium may be connected to the processor, such that the processor may read information from the storage medium, and store and write information into the storage medium. Optionally, the storage medium may be further integrated into the processor. The processor and the storage medium may be disposed in an ASIC, and the ASIC may be disposed in a terminal device. Optionally, the processor and the storage medium may alternatively be disposed in different components of the terminal device.

These computer program instructions may alternatively be loaded onto a computer or another programmable data processing device, such that a series of operation steps are performed on the computer or the other programmable device, to generate computer-implemented processing. Therefore, the instructions executed on the computer or the other programmable device provide steps for implementing a function specified in one or more processes in the flow-charts and/or in one or more blocks in the block diagrams.

Although this application is described with reference to example features and the embodiments thereof, various modifications and combinations may be made to this application without departing from the scope of this application. Correspondingly, the specification and accompanying drawings are merely example description of this application defined by the appended claims, and is considered as covering any of or all modifications, variations, combinations, or equivalents within the scope of this application. A person skilled in the art can make various modifications and variations to this application without departing from the spirit and scope of this application. This application is intended to cover these modifications and variations of this application provided that they fall within the scope of the claims and their equivalent technologies.

What is claimed is:

1. A session processing method comprising:

receiving, by a first session management network element and from a policy control network element, access point information of an application of a first session, wherein the access point information comprises an indication of application relocation possibility indicating that application relocation for the application is not possible, and wherein the first session is for transmitting a first data flow of the application;

determining, by the first session management network element in response to the indication of application relocation possibility indicating that application relocation for the application is not possible, that the first session management network element also serves a second session for transmitting the first data flow;

sending, by the first session management network element and to an access and mobility management function network element, a notification message comprising a first identifier of the first session, a session modification command, and a cause value, wherein the cause value indicates to establish the second session for a same data network as the first session;

receiving, by the first session management network element and from the access and mobility management function network element, a request message requesting establishment of the second session in the data network and comprising the first identifier and a second identifier of the second session; and allocating, by the first session management network element, a first user plane network element to the second session for transmitting the first data flow.

2. The session processing method of claim 1, wherein a mode type of the first session is a session and service continuity (SSC) mode 3.

3. The session processing method of claim 1, further comprising releasing, by the first session management network element, the first session a predetermined time after establishing the second session.

4. The session processing method of claim 1, further comprising allocating, by the first session management network element, a second user plane network element to the second session for transmitting a second data flow corresponding to a second application that supports a data network access identifier (DNAI) change.

5. The session processing method of claim 1, further comprising sending, by the first session management network element and to a second session management network element, policy information that is for the second session management network element to allocate a second user plane network element to the second session for transmitting a third data flow when the application supports a data network access identifier (DNAI) change.

6. A first session management network element comprising:

a memory configured to store instructions; and at least one processor coupled to the memory and configured to execute the instructions to cause the first session management network element to:

receive, from a policy control network element, access point information of an application of a first session, wherein the access point information comprises an indication of application relocation possibility indicating that application relocation for the application is not possible, and wherein the first session is for transmitting a first data flow of the application;

determine, in response to the indication of application relocation possibility indicating that application relocation for the application is not possible, that the first session management network element also serves a second session for transmitting the first data flow;

send, to an access and mobility management function network element, a notification message comprising a first identifier of the first session, a session modification command, and a cause value, wherein the cause value indicates to establish the second session for a same data network as the first session;

receive, from the access and mobility management function network element, a request message requesting establishment of the second session in the data network and comprising the first identifier and a second identifier of the second session; and allocate a first user plane network element for transmitting the first data flow.

7. The first session management network element of claim 6, wherein a mode type of the first session is a session and service continuity (SSC) mode 3.

8. The first session management network element of claim 6, wherein the at least one processor is further configured to execute the instructions to cause the first session management network element to release the first session a predetermined time after establishing the second session.

9. The first session management network element of claim 6, wherein the at least one processor is further configured to execute the instructions to cause the first session management network element to allocate a second user plane network element to the second session for transmitting a second data flow corresponding to a second application that supports a data network access identifier (DNAI) change.

10. The first session management network element of claim 6, wherein the at least one processor is further configured to execute the instructions to cause the first session management network element to send, to a second session management network element, policy information that is for the second session management network element to allocate a second user plane network element to the second session for transmitting a third data flow when the application supports a data network access identifier (DNAI) change.

11. A communication system comprising:
a user plane network element; and
a session management network element configured to:
receive, from a policy control network element, access point information of an application of a first session, wherein the access point information comprises an indication of application relocation possibility indicating that application relocation for the application is not possible, and wherein the first session is for transmitting a data flow of the application;
determine, in response to the indication of application relocation possibility indicating that application relocation for the application is not possible, that the session management network element also serves a second session for transmitting the data flow;
send, to an access and mobility management function network element, a notification message comprising a first identifier of the first session, a session modification command, and a cause value, wherein the cause value indicates to establish the second session for a same data network as the first session;
receive, from the access and mobility management function network element, a request message requesting establishment of the second session in the data network and comprising the first identifier and a second identifier of the second session; and
allocate the user plane network element to the second session,
wherein the user plane network element is configured to transmit, in the second session, the data flow.

12. The communication system of claim 11, further comprising the access and mobility management function network element, wherein the access and mobility management function network element is configured to send the request message to the session management network element.

13. A method comprising:
receiving, by a session management network element and from a policy control network element, access point information of an application of a first session, wherein the access point information comprises an indication of application relocation possibility indicating that application relocation for the application is not possible, and wherein the first session is for transmitting a first data flow of the application;
determining, by the session management network element in response to the indication of application relocation possibility indicating that application relocation for the application is not possible, that the session management network element also serves a second session for transmitting the first data flow;

sending, by the session management network element and to an access and mobility management function network element, a notification message comprising a first identifier of the first session, a session modification command, and a cause value, wherein the cause value indicates to establish the second session for a same data network as the first session;
receiving, by the session management network element and from the access and mobility management function network element, a request message requesting establishment of the second session in the data network and comprising the first identifier and a second identifier of the second session;
allocating, by the session management network element, a first user plane network element to the second session; and
transmitting, by the first user plane network element, the first data flow.

14. The method of claim 13, further comprising allocating, by the session management network element, a second user plane network element to the second session.

15. The method of claim 14, further comprising transmitting, by the second user plane network element, a second data flow corresponding to a second application that supports a data network access identifier (DNAI) change in the second session.

16. The method of claim 13, wherein a mode type of the first session is a session and service continuity (SSC) mode 3.

17. The method of claim 13, further comprising receiving, by the access and mobility management function network element, the notification message.

18. The method of claim 13, further comprising sending, by the access and mobility management function network element and to the session management network element, the request message.

19. A non-transitory computer-readable storage medium configured to store instructions that, when executed by at least one processor, cause a communications apparatus to:
receive, from a policy control network element, access point information of an application of a first session, wherein the access point information comprises an indication of application relocation possibility indicating that application relocation for the application is not possible, and wherein the first session is for transmitting a data flow of the application;
determine, in response to the indication of application relocation possibility indicating that application relocation for the application is not possible, that a session management network element also serves a second session for transmitting the data flow;
send, to an access and mobility management function network element, a notification message comprising a first identifier of the first session, a session modification command, and a cause value, wherein the cause value indicates to establish the second session for a same data network as the first session;
receive, from the access and mobility management function network element, a request message requesting establishment of the second session in the data network and comprising the first identifier and a second identifier of the second session; and
allocate a user plane network element to the second session for transmitting the data flow.

20. The non-transitory computer-readable storage medium of claim 19, wherein a mode type of the first session is a session and service continuity (SSC) mode 3.

21. The non-transitory computer-readable storage medium of claim 19, wherein the instructions, when executed by the at least one processor, further cause the communications apparatus to release the first session a predetermined time after establishing the second session.

22. The non-transitory computer-readable storage medium of claim 19, wherein the instructions, when executed by the at least one processor, further cause the communications apparatus to allocate a second user plane network element to the second session for transmitting a second data flow corresponding to a second application that supports a data network access identifier (DNAI) change.

* * * * *